United States Patent
Sun et al.

(10) Patent No.: US 12,556,232 B2
(45) Date of Patent: Feb. 17, 2026

(54) COMMUNICATION METHOD AND COMMUNICATION APPARATUS

(71) Applicant: HUAWEI TECHNOLOGIES CO., LTD., Shenzhen (CN)

(72) Inventors: Huan Sun, Shenzhen (CN); Xiaoyan Bi, Ottawa (CA); Lei Dong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/788,043

(22) Filed: Jul. 29, 2024

(65) Prior Publication Data

US 2024/0396590 A1 Nov. 28, 2024

Related U.S. Application Data

(63) Continuation of application No. PCT/CN2023/072302, filed on Jan. 16, 2023.

(30) Foreign Application Priority Data

Jan. 30, 2022 (CN) .......................... 202210114465.4

(51) Int. Cl.
*H04B 7/04* (2017.01)
*H04B 7/024* (2017.01)

(52) U.S. Cl.
CPC ......... *H04B 7/04013* (2023.05); *H04B 7/024* (2013.01)

(58) Field of Classification Search
CPC ................ H04B 7/04013; H04B 7/024; H04B 7/15528; H04B 7/04026; G01S 5/0273; G01S 5/12; H04W 64/00; H04W 24/08
See application file for complete search history.

(56) References Cited

U.S. PATENT DOCUMENTS

| 2004/0014433 A1 | 1/2004 | Hamada et al. |
| 2015/0382152 A1 | 12/2015 | Lindskog et al. |
| 2020/0096599 A1 | 3/2020 | Hewett et al. |
| 2021/0126359 A1 * | 4/2021 | Kim ...................... H04B 7/145 |

FOREIGN PATENT DOCUMENTS

| WO | 2021006793 A1 | 1/2021 |
| WO | 2021221603 A1 | 11/2021 |
| WO | 2021236510 A1 | 11/2021 |
| WO | 2023048874 A1 | 3/2023 |

* cited by examiner

*Primary Examiner* — Sung S Ahn

(74) *Attorney, Agent, or Firm* — Leydig, Voit & Mayer, Ltd.

(57) ABSTRACT

A communication method and a communication apparatus are provided. The method includes: a terminal device obtains a channel measurement result, wherein the channel measurement result is obtained by the terminal device based on at least two reflections by an antenna element set of an intelligent reflecting surface for a first signal sent by a network device, the first signal is a signal for channel measurement, and the antenna element set includes at least two antenna elements; and the terminal device determines a path difference between the antenna elements of the intelligent reflecting surface based on the channel measurement result.

20 Claims, 5 Drawing Sheets

COMMUNICATION METHOD AND COMMUNICATION APPARATUS

CROSS-REFERENCE TO RELATED APPLICATIONS

This application is a continuation of International Application No. PCT/CN2023/072302, filed on Jan. 16, 2023, which claims priority to Chinese Patent Application No. 202210114465.4, filed on Jan. 30, 2022. The disclosures of the aforementioned applications are hereby incorporated by reference in their entireties.

TECHNICAL FIELD

Embodiments of this application relate to the communication field, and more specifically, to a communication method and a communication apparatus.

BACKGROUND

In a new radio (NR) communication system, a network device positions a terminal device based on an angle of arrival (AoA) of the terminal device and a timing advance (TA) between the terminal device and the network device. The AoA may be specifically determined based on a multiple signal classification (MUSIC) algorithm. The MUSIC algorithm is an algorithm based on subspace decomposition, and uses orthogonality of signal subspace and noise subspace to construct a spatial spectral function and estimates a signal parameter through peak search.

When the network device and the terminal device are far away from each other, even a small AoA measurement error causes a large positioning deviation. An intelligent reflecting surface includes only a passive antenna element, and does not have a signal processing function. Therefore, an existing angle estimation technology cannot be used.

Therefore, how to complete high-precision measurement of an orientation of the terminal device in a scenario including the intelligent reflecting surface is an urgent technical problem to be resolved currently.

SUMMARY

Embodiments of this application provide a communication method and a communication apparatus, to complete high-precision measurement of an orientation of a terminal device in a scenario including an intelligent reflecting surface.

According to a first aspect, a communication method is provided, and includes: A terminal device obtains a channel measurement result, where the channel measurement result is obtained by the terminal device based on at least two reflections by an antenna element set of an intelligent reflecting surface for a first signal sent by a network device, the first signal is for channel measurement, and the antenna element set includes at least two antenna elements; and the terminal device determines a path difference between the antenna elements of the intelligent reflecting surface based on the channel measurement result.

The terminal device determines the path difference based on the channel measurement result determined based on the at least two reflections by the antenna element set of the intelligent reflecting surface for the first signal sent by the network device, and may determine an orientation of the terminal device with high precision based on the path difference. In other words, the path difference determined by the terminal device can be used to position a location of the terminal device.

Specifically, when the orientation of the terminal device is positioned with high precision, the terminal device may determine, based on the path difference, an angle between the terminal device and the intelligent reflecting surface and/or an angle between the network device and the intelligent reflecting surface, so that the orientation of the terminal device is determined with high precision based on the foregoing angles and an angle between the terminal device and the network device. In addition, after the path difference is determined, the angle between the terminal device and the intelligent reflecting surface and the angle between the network device and the intelligent reflecting surface may be determined based on a known location of the network device and a known location of the intelligent reflecting surface. Therefore, in embodiments of this application, the orientation of the terminal device can be simply determined based on the path difference with high precision.

According to the foregoing technical solutions, in embodiments of this application, high-precision measurement of the orientation of the terminal device can be completed in a scenario including the intelligent reflecting surface, and positioning precision can be improved.

In addition, in embodiments of this application, an estimation result of a channel from the terminal device to the intelligent reflecting surface and then to the network device may be further determined based on the path difference in a manner with low pilot signal overheads.

With reference to the first aspect, in some implementations of the first aspect, the antenna element set includes a first antenna element set and a second antenna element set, where the first antenna element set includes at least one first antenna element, and the second antenna element set includes at least one second antenna element; and the first antenna element set and the second antenna element set correspond to different phases in the at least two reflections.

In embodiments of this application, a phase of an antenna element set in each reflection process is adjusted, and the path difference between the antenna elements of the intelligent reflecting surface is determined based on a plurality of obtained channel measurement results. In addition, a positioning result of the terminal device with high precision may be further obtained based on the path difference, and the estimation result of the channel from the terminal device to the intelligent reflecting surface and then to the network device is obtained in the manner with the low pilot signal overheads.

With reference to the first aspect, in some implementations of the first aspect, the different phases include any one of the following groups: the first antenna element set corresponds to a first phase, and the second antenna element set corresponds to the first phase; the first antenna element set corresponds to a first phase, and the second antenna element set corresponds to a second phase; the first antenna element set corresponds to a second phase, and the second antenna element set corresponds to a first phase; or the first antenna element set corresponds to a second phase, and the second antenna element set corresponds to the second phase, where the first phase is different from the second phase.

The phase corresponding to the antenna element set of the intelligent reflecting surface in each reflection process is adjusted, and different reflection processes correspond to different phases. In this way, in embodiments of this application, the path difference between the antenna elements of the intelligent reflecting surface is determined based on the plurality of channel measurement results corresponding to the different phases.

With reference to the first aspect, in some implementations of the first aspect, the first phase is an even multiple of $\pi$, and the second phase is an odd multiple of $\pi$; or the first phase is an odd multiple of $\pi$, and the second phase is an even multiple of $\pi$.

With reference to the first aspect, in some implementations of the first aspect, the method further includes at least one of the following: The terminal device determines a first angle between the network device and the intelligent reflecting surface based on the path difference; or the terminal device determines a second angle between the intelligent reflecting surface and the terminal device based on the path difference.

It should be understood that the first angle may be understood as an incident angle, and the second angle may be understood as a reflection angle. The incident angle is an included angle between a normal and the first signal transmitted by the network device to the intelligent reflecting surface. The reflection angle is an included angle between the normal and a signal that is obtained through reflection by the intelligent reflecting surface for the first signal transmitted by the network device.

It should be understood that the first angle is the incident angle and the second angle is the reflection angle for the first signal transmitted by the network device to the intelligent reflecting surface. When the terminal device sends a first signal to the intelligent reflecting surface, the first angle is the reflection angle, and the second angle is the incident angle. When the network device sends the first signal to the intelligent reflecting surface, the first angle is the incident angle, and the second angle is the reflection angle.

According to the foregoing technical solution, in embodiments of this application, the second angle between the terminal device and the intelligent reflecting surface or the first angle between the intelligent reflecting surface and the network device is determined based on the path difference. The first angle or the second angle can be used to further determine the location or the orientation of the terminal device, to improve positioning precision of the terminal device.

With reference to the first aspect, in some implementations of the first aspect, the method further includes: The terminal device sends the second angle to the network device.

According to the foregoing technical solution, in embodiments of this application, the network device can determine the location of the terminal device based on the second angle, the location of the network device, the location of the intelligent reflecting surface, and the angle between the terminal device and the network device. In this way, a positioning result with higher precision can be obtained.

With reference to the first aspect, in some implementations of the first aspect, the method further includes: The terminal device determines a distance between the terminal device and the intelligent reflecting surface based on a location of the intelligent reflecting surface and a location of the terminal device.

According to the foregoing technical solution, in embodiments of this application, a quantity of antenna elements that are for data transmission and that are in the intelligent reflecting surface is further determined based on the distance between the terminal device and the intelligent reflecting surface. In this way, it can be ensured that a channel between the terminal device and the intelligent reflecting surface satisfies a far-field radiation model. The model can ensure accuracy and convenience of modeling, measurement, and data processing on the channel between the terminal device and the intelligent reflecting surface.

With reference to the first aspect, in some implementations of the first aspect, the method further includes: The terminal device sends the distance between the terminal device and the intelligent reflecting surface to the network device.

According to the foregoing technical solution, in embodiments of this application, the network device can determine, based on a relationship between the distance and a Rayleigh distance between the terminal device and the intelligent reflecting surface, the quantity of antenna elements that are for data transmission and that are in the intelligent reflecting surface. In this way, it can be ensured that the channel between the terminal device and the intelligent reflecting surface satisfies the far-field radiation model. The model can ensure the accuracy and the convenience of the modeling, the measurement, and the data processing on the channel between the terminal device and the intelligent reflecting surface.

With reference to the first aspect, in some implementations of the first aspect, the method further includes: The terminal device determines, based on the distance and a Rayleigh distance between the terminal device and the intelligent reflecting surface, a quantity of antenna elements that are for data transmission and that are in the intelligent reflecting surface.

It should be understood that the quantity of determined antenna elements that are for data transmission and that are in the intelligent reflecting surface is related to an antenna aperture that is for data transmission and that is in the intelligent reflecting surface.

In embodiments of this application, the quantity of antenna elements that are for data transmission and that are in the intelligent reflecting surface is determined based on the relationship between the distance between the intelligent reflecting surface and the terminal device and the Rayleigh distance between the intelligent reflecting surface and the terminal device. In this way, it can be ensured that the channel between the terminal device and the intelligent reflecting surface satisfies the far-field radiation model. The model can ensure the accuracy and the convenience of the modeling, the measurement, and the data processing on the channel between the terminal device and the intelligent reflecting surface.

With reference to the first aspect, in some implementations of the first aspect, the method further includes: The terminal device sends the quantity of antenna elements for data transmission to the network device.

According to the foregoing technical solution, in embodiments of this application, the network device obtains the quantity of antenna elements that are for data transmission and that are in the intelligent reflecting surface. In this way, it can be ensured that the channel between the terminal device and the intelligent reflecting surface satisfies the far-field radiation model. The model can ensure the accuracy and the convenience of the modeling, the measurement, and the data processing on the channel between the terminal device and the intelligent reflecting surface.

With reference to the first aspect, in some implementations of the first aspect, the quantity of antenna elements for data transmission is associated with the distance between the terminal device and the intelligent reflecting surface, a carrier frequency, and a bandwidth.

According to a second aspect, a communication method is provided and includes: A network device obtains a channel measurement result, where the channel measurement result is obtained by the network device based on at least two reflections by an antenna element set of an intelligent reflecting surface for a first signal sent by a terminal device, the first signal is for channel measurement, and the antenna element set includes at least two antenna elements; and the network device determines a path difference between the antenna elements of the intelligent reflecting surface based on the channel measurement result.

The network device determines the path difference between the antenna elements of the intelligent reflecting surface based on the channel measurement result determined based on the at least two reflections by the antenna element set of the intelligent reflecting surface for the first signal sent by the terminal device, and may determine an angle between the terminal device and the intelligent reflecting surface based on the path difference and an angle between the network device and the intelligent reflecting surface, to determine an orientation of the terminal device. In other words, the path difference determined by the network device can be used to position a location of the terminal device.

Specifically, when the orientation of the terminal device is positioned with high precision, the path difference is a core feature. For example, the network device may determine, based on the path difference, an angle between the terminal device and the intelligent reflecting surface, and an angle between the network device and the intelligent reflecting surface, so that the orientation of the terminal device is determined with high precision based on the foregoing angles and an angle between the terminal device and the network device. In addition, after the path difference is determined, the angle between the terminal device and the intelligent reflecting surface and the angle between the network device and the intelligent reflecting surface may be determined based on a known location of the network device and a known location of the intelligent reflecting surface. Therefore, in embodiments of this application, the orientation of the terminal device can be simply determined based on the path difference with high precision.

According to the foregoing technical solutions, in embodiments of this application, high-precision measurement of the orientation of the terminal device can be completed in a scenario including the intelligent reflecting surface, and positioning precision can be improved.

In addition, in embodiments of this application, an estimation result of a channel from the terminal device to the intelligent reflecting surface and then to the network device may be further determined based on the path difference in a manner with low pilot signal overheads.

With reference to the second aspect, in some implementations of the second aspect, the antenna element set includes a first antenna element set and a second antenna element set, where the first antenna element set includes at least one first antenna element, and the second antenna element set includes at least one second antenna element; and the first antenna element set and the second antenna element set correspond to different phases in the at least two reflections.

In embodiments of this application, a phase of an antenna element set in each reflection process is adjusted, and the path difference between the antenna elements of the intelligent reflecting surface is determined based on a plurality of obtained channel measurement results. In addition, a positioning result of the terminal device with high precision may be further obtained based on the path difference, and the estimation result of the channel from the terminal device to the intelligent reflecting surface and then to the network device is obtained in the manner with the low pilot signal overheads.

With reference to the second aspect, in some implementations of the second aspect, the different phases include any one of the following groups: the first antenna element set corresponds to a first phase, and the second antenna element set corresponds to the first phase; the first antenna element set corresponds to a first phase, and the second antenna element set corresponds to a second phase; the first antenna element set corresponds to a second phase, and the second antenna element set corresponds to a first phase; or the first antenna element set corresponds to a second phase, and the second antenna element set corresponds to the second phase, where the first phase is different from the second phase.

A phase corresponding to the antenna element set of the intelligent reflecting surface in each reflection process is adjusted, and different reflection processes correspond to different phases. In this way, in embodiments of this application, the path difference between the antenna elements of the intelligent reflecting surface is determined based on the plurality of channel measurement results corresponding to the different phases.

With reference to the second aspect, in some implementations of the second aspect, the first phase is an even multiple of $\pi$, and the second phase is an odd multiple of $\pi$; or the first phase is an odd multiple of $\pi$, and the second phase is an even multiple of $\pi$.

With reference to the second aspect, in some implementations of the second aspect, the method further includes at least one of the following: The network device determines a first angle between the network device and the intelligent reflecting surface based on the path difference; or the network device determines a second angle between the intelligent reflecting surface and the terminal device based on the path difference.

According to the foregoing technical solution, the network device in embodiments of this application determines, based on the path difference, the second angle between the terminal device and the intelligent reflecting surface or the first angle between the intelligent reflecting surface and the network device. The first angle or the second angle can be used to further determine the location or the orientation of the terminal device, to obtain a positioning result of the terminal device with higher precision.

With reference to the second aspect, in some implementations of the second aspect, the method further includes: The network device determines a location of the terminal device based on the second angle.

Specifically, the network device may determine the location of the terminal device based on the second angle, the angle between the terminal device and the network device, the location of the network device, and the location of the intelligent reflecting surface. In this way, the positioning result of the terminal device with higher precision can be obtained.

With reference to the second aspect, in some implementations of the second aspect, the method further includes: The network device determines a distance between the terminal device and the intelligent reflecting surface; and the network device determines, based on the distance and a Rayleigh distance between the terminal device and the intelligent reflecting surface, a quantity of antenna elements that are for data transmission and that are in the intelligent reflecting surface.

According to the foregoing technical solution, the network device determines, based on a relationship between the distance and the Rayleigh distance between the terminal device and the intelligent reflecting surface, the quantity of antenna elements that are for data transmission and that are in the intelligent reflecting surface. In this way, in embodiments of this application, it can be ensured that a channel between the terminal device and the intelligent reflecting surface satisfies a far-field radiation model. The model can ensure accuracy and convenience of modeling, measurement, and data processing on the channel between the terminal device and the intelligent reflecting surface.

With reference to the second aspect, in some implementations of the second aspect, that the network device determines a distance between the terminal device and a reflecting device includes: The network device determines the distance between the terminal device and the intelligent reflecting surface based on the location of the terminal device and a location of the intelligent reflecting surface.

With reference to the second aspect, in some implementations of the second aspect, that the network device determines a distance between the terminal device and the intelligent reflecting surface includes: The network device receives a distance sent by the terminal device, where the distance is determined by the terminal device based on the location of the intelligent reflecting surface and the location of the terminal device.

With reference to the second aspect, in some implementations of the second aspect, the quantity of antenna elements for data transmission is associated with the distance between the terminal device and the intelligent reflecting surface, a carrier frequency, and a bandwidth.

With reference to the second aspect, in some implementations of the second aspect, the method further includes: The network device sends first information to the intelligent reflecting surface, where the first information includes at least one of the following: a codebook set, the distance between the terminal device and the intelligent reflecting surface, or the quantity of antenna elements that are for data transmission and that are in the intelligent reflecting surface, where the codebook set includes at least one codebook, and one codebook includes at least one of the following: an amplitude or a phase of one antenna element of the intelligent reflecting surface.

According to the foregoing technical solutions, in embodiments of this application, the intelligent reflecting surface can have autonomy in selecting a codebook, to reduce complexity of implementing a controller of the intelligent reflecting surface by the network device, and improve flexibility of a system design.

With reference to the second aspect, in some implementations of the second aspect, the codebook set includes a near-field codebook and a far-field codebook, and the method further includes: The network device sends indication information to the intelligent reflecting surface, where the indication information indicates the intelligent reflecting surface to select the near-field codebook or the far-field codebook.

According to the foregoing technical solution, in embodiments of this application, the network device can dynamically indicate the intelligent reflecting surface to select an appropriate codebook type. In this way, a codebook of the intelligent reflecting surface can match an actual far-field model or near-field model, to reduce a bit error rate of a system and improve system spectral efficiency.

According to a third aspect, a communication method is provided and includes: An intelligent reflecting surface obtains first information, where the first information includes at least one of the following: a codebook set, a distance between a terminal device and the intelligent reflecting surface, or a quantity of antenna elements that are for data transmission and that are in the intelligent reflecting surface, where the codebook set includes at least one codebook, and one codebook includes at least one of the following: an amplitude or a phase of one antenna element of the intelligent reflecting surface; and the intelligent reflecting surface determines second information based on the first information, where the second information includes at least one codebook for data transmission.

It should be understood that the first information obtained by the intelligent reflecting surface may be sent by the network device to the intelligent reflecting surface, or may be configured in the intelligent reflecting surface in a pre-configuration manner, or may be obtained in another manner.

According to the foregoing technical solutions, in embodiments of this application, the intelligent reflecting surface can have autonomy in selecting a codebook, to reduce complexity of implementing a controller of the intelligent reflecting surface by the network device, and improve flexibility of a system design.

With reference to the third aspect, in some implementations of the third aspect, a quantity of codebooks in the codebook set for data transmission is the same as the quantity of antenna elements for data transmission.

It should be understood that the quantity of codebooks in the codebook set for data transmission is consistent with the quantity of antenna elements that are for data transmission and that are in the intelligent reflecting surface.

With reference to the third aspect, in some implementations of the third aspect, the codebook set includes a near-field codebook and a far-field codebook, and the method further includes: The intelligent reflecting surface receives indication information sent by a network device, where the indication information indicates the intelligent reflecting surface to select the near-field codebook or the far-field codebook.

According to a fourth aspect, a communication method is provided and includes: A network device receives a second angle that is between an intelligent reflecting surface and a terminal device and that is sent by the terminal device; and the network device determines a location of the terminal device based on the second angle.

Specifically, the network device determines the location of the terminal device based on the second angle, an angle between the terminal device and the network device, a location of the network device, and a location of the intelligent reflecting surface. In this way, a positioning result of the terminal device with higher precision can be obtained.

With reference to the fourth aspect, in some implementations of the fourth aspect, after the network device determines the location of the terminal device based on the second angle, the method further includes: The network device determines the quantity of antenna elements that are for data transmission and that are in the intelligent reflecting surface.

According to the foregoing technical solution, in embodiments of this application, based on the determined quantity of antenna elements, it can be ensured that a channel between the terminal device and the intelligent reflecting surface satisfies a far-field radiation model. The model can ensure accuracy and convenience of modeling, measurement, and data processing on the channel between the terminal device and the intelligent reflecting surface.

With reference to the fourth aspect, in some implementations of the fourth aspect, that the network device determines a quantity of antenna elements for data transmission includes: The network device determines a distance between the terminal device and the intelligent reflecting surface; and the network device determines, based on the distance and a Rayleigh distance between the terminal device and the intelligent reflecting surface, the quantity of antenna elements for data transmission.

With reference to the fourth aspect, in some implementations of the fourth aspect, that the network device determines a distance between the terminal device and the intelligent reflecting surface includes: The network device determines the distance between the terminal device and the intelligent reflecting surface based on the location of the terminal device and a location of the intelligent reflecting surface.

With reference to the fourth aspect, in some implementations of the fourth aspect, the method further includes: The network device receives the distance that is between the terminal device and the intelligent reflecting surface and that is sent by the terminal device, where the distance between the terminal device and the intelligent reflecting surface is determined by the terminal device based on a location of the intelligent reflecting surface and the location of the terminal device.

With reference to the fourth aspect, in some implementations of the fourth aspect, that the network device determines a quantity of antenna elements for data transmission includes: The network device receives the quantity of antenna elements that are for data transmission and that are sent by the terminal device.

With reference to the fourth aspect, in some implementations of the fourth aspect, the quantity of antenna elements for data transmission is associated with the distance between the terminal device and the intelligent reflecting surface, a carrier frequency, and a bandwidth.

With reference to the fourth aspect, in some implementations of the fourth aspect, the method further includes: The network device sends first information to the intelligent reflecting surface, where the first information includes at least one of the following: a codebook set, the distance between the terminal device and the intelligent reflecting surface, or the quantity of antenna elements that are for data transmission and that are in the intelligent reflecting surface, where the codebook set includes at least one codebook, and one codebook includes at least one of the following: an amplitude or a phase of one antenna element of the intelligent reflecting surface.

According to the foregoing technical solutions, in embodiments of this application, the intelligent reflecting surface can have autonomy in selecting a codebook, to reduce complexity of implementing a controller of the intelligent reflecting surface by the network device, and improve flexibility of a system design.

With reference to the fourth second aspect, in some implementations of the fourth aspect, the codebook set includes a near-field codebook and a far-field codebook, and the method further includes: The network device further sends indication information to the intelligent reflecting surface, where the indication information indicates the intelligent reflecting surface to select the near-field codebook or the far-field codebook.

According to the foregoing technical solution, in embodiments of this application, the network device can dynamically indicate the intelligent reflecting surface to select an appropriate codebook type. In this way, a codebook of the intelligent reflecting surface can match an actual far-field model or near-field model, to reduce a bit error rate of a system and improve system spectral efficiency.

With reference to a fifth aspect, a communication method is provided and includes: A network device sends first information to an intelligent reflecting surface, where the first information includes at least one of the following: a codebook set, a distance between a terminal device and an intelligent reflecting surface, or a quantity of antenna elements that are for data transmission and that are in the intelligent reflecting surface, where the codebook set includes at least one codebook, and one codebook includes at least one of the following: an amplitude or a phase of one antenna element of the intelligent reflecting surface.

According to the foregoing technical solutions, in embodiments of this application, the intelligent reflecting surface can have autonomy in selecting a codebook, to reduce complexity of implementing a controller of the intelligent reflecting surface by the network device, and improve flexibility of a system design.

With reference to the fifth second aspect, in some implementations of the fifth aspect, the codebook set includes a near-field codebook and a far-field codebook, and the method further includes: The network device further sends indication information to the intelligent reflecting surface, where the indication information indicates the intelligent reflecting surface to select the near-field codebook or the far-field codebook.

According to a sixth aspect, a communication method is provided and includes: A network device determines a distance between a terminal device and an intelligent reflecting surface; and the network device determines, based on the distance and a Rayleigh distance between the terminal device and the intelligent reflecting surface, a quantity of antenna elements that are for data transmission and that are in the intelligent reflecting surface.

In embodiments of this application, the quantity of antenna elements that are for data transmission and that are in the intelligent reflecting surface is determined based on the distance between the intelligent reflecting surface and the terminal device. In this way, it can be ensured that a channel between the terminal device and the intelligent reflecting surface satisfies a far-field radiation model. The model can ensure accuracy and convenience of modeling, measurement, and data processing on the channel between the terminal device and the intelligent reflecting surface.

With reference to the sixth aspect, in some implementations of the sixth aspect, that a network device determines a distance between a terminal device and an intelligent reflecting surface includes: The network device determines the distance between the terminal device and the intelligent reflecting surface based on a location of the terminal device and a location of the intelligent reflecting surface.

With reference to the sixth aspect, in some implementations of the sixth aspect, that a network device determines a distance between a terminal device and an intelligent reflecting surface includes: The network device receives the distance that is between the terminal device and the intelligent reflecting surface and that is sent by the terminal device, where the distance between the terminal device and the intelligent reflecting surface is determined by the terminal device based on a location of the intelligent reflecting surface and a location of the terminal device.

With reference to the sixth aspect, in some implementations of the sixth aspect, the quantity of antenna elements for data transmission is associated with the distance between the terminal device and the intelligent reflecting surface, a carrier frequency, and a bandwidth.

According to a seventh aspect, a communication apparatus is provided and includes: a transceiver unit, configured to obtain a channel measurement result, where the channel measurement result is obtained by the communication apparatus based on at least two reflections by an antenna element set of an intelligent reflecting surface for a first signal sent by a network device, the first signal is for channel measurement, and the antenna element set includes at least two antenna elements; and a processing unit, configured to determine a path difference between the antenna elements of the intelligent reflecting surface based on the channel measurement result.

With reference to the seventh aspect, in some implementations of the seventh aspect, the antenna element set includes a first antenna element set and a second antenna element set, where the first antenna element set includes at least one first antenna element, the second antenna element set includes at least one second antenna element, and the first antenna element set and the second antenna element set correspond to different phases in the at least two reflections.

With reference to the seventh aspect, in some implementations of the seventh aspect, the different phases include any one of the following groups: the first antenna element set corresponds to a first phase, and the second antenna element set corresponds to the first phase; the first antenna element set corresponds to a first phase, and the second antenna element set corresponds to a second phase; the first antenna element set corresponds to a second phase, and the second antenna element set corresponds to a first phase; or the first antenna element set corresponds to the second phase, and the second antenna element set corresponds to the second phase, where the first phase is different from the second phase.

With reference to the seventh aspect, in some implementations of the seventh aspect, the first phase is an even multiple of $\pi$, and the second phase is an odd multiple of $\pi$; or the first phase is an odd multiple of $\pi$, and the second phase is an even multiple of $\pi$.

With reference to the seventh aspect, in some implementations of the seventh aspect, the processing unit is further configured to determine a first angle between the network device and the intelligent reflecting surface based on the path difference; or the processing unit is further configured to determine a second angle between the intelligent reflecting surface and the terminal device based on the path difference.

With reference to the seventh aspect, in some implementations of the seventh aspect, the transceiver unit is further configured to send the second angle to the network device.

With reference to the seventh aspect, in some implementations of the seventh aspect, the processing unit is further configured to determine a distance between the communication apparatus and the intelligent reflecting surface based on a location of the intelligent reflecting surface and a location of the communication apparatus.

With reference to the seventh aspect, in some implementations of the seventh aspect, the transceiver unit is further configured to send the distance between the communication apparatus and the intelligent reflecting surface to the network device.

With reference to the seventh aspect, in some implementations of the seventh aspect, the processing unit is further configured to determine, based on the distance between the communication apparatus and the intelligent reflecting surface and a Rayleigh distance, a quantity of antenna elements that are for data transmission and that are in the intelligent reflecting surface.

With reference to the seventh aspect, in some implementations of the seventh aspect, the transceiver unit is further configured to send, to the network device, the quantity of antenna elements for data transmission.

With reference to the seventh aspect, in some implementations of the seventh aspect, the quantity of antenna elements for data transmission is associated with the distance between the terminal device and the intelligent reflecting surface, a carrier frequency, and a bandwidth.

According to an eighth aspect, a communication apparatus is provided and includes: a transceiver unit, configured to obtain a channel measurement result, where the channel measurement result is obtained by the communication apparatus based on at least two reflections by an antenna element set of an intelligent reflecting surface for a first signal sent by a terminal device, the first signal is for channel measurement, and the antenna element set includes at least two antenna elements; and a processing unit, configured to determine a path difference between the antenna elements of the intelligent reflecting surface based on the channel measurement result.

With reference to the eighth aspect, in some implementations of the eighth aspect, the antenna element set includes a first antenna element set and a second antenna element set, where the first antenna element set includes at least one first antenna element, the second antenna element set includes at least one second antenna element, and the first antenna element set and the second antenna element set correspond to different phases in the at least two reflections.

With reference to the eighth aspect, in some implementations of the eighth aspect, the different phases include any one of the following groups: the first antenna element set corresponds to a first phase, and the second antenna element set corresponds to the first phase; the first antenna element set corresponds to a first phase, and the second antenna element set corresponds to a second phase; the first antenna element set corresponds to a second phase, and the second antenna element set corresponds to a first phase; or the first antenna element set corresponds to a second phase, and the second antenna element set corresponds to the second phase, where the first phase is different from the second phase.

With reference to the eighth aspect, in some implementations of the eighth aspect, the first phase is an even multiple of $\pi$, and the second phase is an odd multiple of $\pi$; or the first phase is an odd multiple of $\pi$, and the second phase is an even multiple of $\pi$.

With reference to the eighth aspect, in some implementations of the eighth aspect, the processing unit is further configured to determine a first angle between a network device and the intelligent reflecting surface based on the path difference; or the processing unit is further configured to determine a second angle between intelligent reflecting surface and terminal device based on the path difference.

With reference to the eighth aspect, in some implementations of the eighth aspect, the processing unit is further configured to determine a location of the terminal device based on the second angle.

With reference to the eighth aspect, in some implementations of the eighth aspect, the processing unit is further configured to determine a distance between the terminal device and the intelligent reflecting surface; and the processing unit is further configured to determine, based on the distance and a Rayleigh distance between the terminal device and the intelligent reflecting surface, a quantity of antenna elements that are for data transmission and that are in the intelligent reflecting surface.

With reference to the eighth aspect, in some implementations of the eighth aspect, the processing unit is further configured to determine the distance between the terminal device and the intelligent reflecting surface based on the location of the terminal device and a location of the intelligent reflecting surface.

With reference to the eighth aspect, in some implementations of the eighth aspect, the transceiver unit is further configured to: receive the distance that is between the terminal device and the intelligent reflecting surface and that is sent by the terminal device, where the distance between the terminal device and the intelligent reflecting surface is determined by the terminal device based on the location of the intelligent reflecting surface and the location of the terminal device.

With reference to the eighth aspect, in some implementations of the eighth aspect, the quantity of antenna elements for data transmission is associated with the distance between the terminal device and the intelligent reflecting surface, a carrier frequency, and a bandwidth.

With reference to the eighth aspect, in some implementations of the eighth aspect, the transceiver unit is further configured to: send first information to the intelligent reflecting surface, where the first information includes at least one of the following: a codebook set, the distance between the terminal device and the intelligent reflecting surface, or the quantity of antenna elements that are for data transmission and that are in the intelligent reflecting surface, where the codebook set includes at least one codebook, and one codebook includes at least one of the following: an amplitude or a phase of one antenna element of the intelligent reflecting surface.

With reference to the eighth aspect, in some implementations of the eighth aspect, the codebook set includes a near-field codebook and a far-field codebook, and the transceiver unit is further configured to send indication information to the intelligent reflecting surface, where the indication information indicates the intelligent reflecting surface to select the near-field codebook or the far-field codebook.

According to a ninth aspect, a communication apparatus is provided and includes: an obtaining unit, configured to obtain first information, where the first information includes at least one of the following: a codebook set, a distance between a terminal device and an intelligent reflecting surface, or a quantity of antenna elements that are for data transmission and that are in the intelligent reflecting surface, where the codebook set includes at least one codebook, and one codebook includes at least one of the following: an amplitude or a phase of one antenna element of the intelligent reflecting surface; and a processing unit, configured to determine second information based on the first information, where the second information includes at least one codebook for data transmission.

With reference to the ninth aspect, in some implementations of the ninth aspect, a quantity of codebooks in the codebook set for data transmission is the same as the quantity of antenna elements for data transmission.

With reference ninth aspect, in some implementations of the ninth aspect, the codebook set includes a near-field codebook and a far-field codebook, and the obtaining unit is further configured to receive indication information sent by a network device, where the indication information indicates the communication apparatus to select the near-field codebook or the far-field codebook.

According to a tenth aspect, a communication apparatus is provided and includes: a transceiver unit, configured to receive a second angle that is between an intelligent reflecting surface and a terminal device and that is sent by the terminal device; and a processing unit, configured to determine a location of the terminal device based on the second angle.

With reference to the tenth aspect, in some implementations of the tenth aspect, the processing unit is further to determine a quantity of antenna elements that are for data transmission and that are in the intelligent reflecting surface.

With reference to the tenth aspect, in some implementations of the tenth aspect, the processing unit is further configured to determine a distance between the terminal device and the intelligent reflecting surface; and the processing unit is further configured to determine, based on the distance and a Rayleigh distance between the terminal device and the intelligent reflecting surface, the quantity of antenna elements for data transmission.

With reference to the tenth aspect, in some implementations of the tenth aspect, the processing unit is further configured to determine the distance between the terminal device and the intelligent reflecting surface based on the location of the terminal device and a location of the intelligent reflecting surface.

With reference to the tenth aspect, in some implementations of the tenth aspect, the transceiver unit is further configured to receive a distance that is between the terminal device and the intelligent reflecting surface and that is sent by the terminal device, where the distance between the terminal device and the intelligent reflecting surface is determined by the terminal device based on a location of the intelligent reflecting surface and a location of the terminal device.

With reference to the tenth aspect, in some implementations of the tenth aspect, the transceiver unit is further configured to receive the quantity of antenna elements that are for data transmission and that are sent by the terminal device.

With reference to the tenth aspect, in some implementations of the tenth aspect, the quantity of antenna elements for data transmission is associated with the distance between the terminal device and the intelligent reflecting surface, a carrier frequency, and a bandwidth.

With reference to the tenth aspect, in some implementations of the tenth aspect, the transceiver unit is further configured to: send first information to the intelligent reflecting surface, where the first information includes at least one of the following: a codebook set, the distance between the terminal device and the intelligent reflecting surface, or the quantity of antenna elements that are for data transmission and that are in the intelligent reflecting surface, where the codebook set includes at least one codebook, and one codebook includes at least one of the following: an amplitude or a phase of one antenna element of the intelligent reflecting surface.

With reference tenth aspect, in some implementations of the tenth aspect, the codebook set includes a near-field codebook and a far-field codebook, and the transceiver unit is further configured to send indication information to the intelligent reflecting surface, where the indication information indicates the intelligent reflecting surface to select near-field codebook or far-field codebook.

With reference to an eleventh aspect, a communication apparatus is provided and includes: a sending unit, configured to send first information to an intelligent reflecting surface, where the first information includes at least one of the following: a codebook set, a distance between a terminal device and the intelligent reflecting surface, or a quantity of antenna elements that are for data transmission and that are in the intelligent reflecting surface, where the codebook set includes at least one codebook, and one codebook includes at least one of the following: an amplitude or a phase of one antenna element of the intelligent reflecting surface.

With reference to the eleventh aspect, in some implementations of the eleventh aspect, the codebook set includes a near-field codebook and a far-field codebook, and the sending unit is further configured to send indication information to the intelligent reflecting surface, where the indication information indicates the intelligent reflecting surface to select the near-field codebook or the far-field codebook.

According to a twelfth aspect, a communication apparatus is provided and includes: a processing unit, configured to determine a distance between a terminal device and an intelligent reflecting surface; and the processing unit, further configured to determine, based on the distance and a Rayleigh distance between the terminal device and the intelligent reflecting surface, a quantity of antenna elements that are for data transmission and that are in the intelligent reflecting surface.

With reference to the twelfth aspect, in some implementations of the twelfth aspect, the processing unit is further configured to determine the distance between the terminal device and the intelligent reflecting surface based on a location of the terminal device and a location of the intelligent reflecting surface.

With reference to the twelfth aspect, in some implementations of the twelfth aspect, the communication apparatus further includes a transceiver unit, where the transceiver unit is configured to receive a distance that is between the terminal device and the intelligent reflecting surface and that is sent by the terminal device, where the distance between the terminal device and the intelligent reflecting surface is determined by the terminal device based on a location of the intelligent reflecting surface and a location of the terminal device.

With reference to the twelfth aspect, in some implementations of the twelfth aspect, the quantity of antenna elements for data transmission is associated with the distance between the terminal device and the intelligent reflecting surface, a carrier frequency, and a bandwidth.

According to a thirteenth aspect, a computer-readable storage medium is provided and includes a computer program or instructions, where when the computer program or the instructions are run on a computer, the computer is enabled to perform the method according to any one of the first aspect and the possible implementations of the first aspect; the computer is enabled to perform the method according to any one of the second aspect and the possible implementations of the second aspect; the computer is enabled to perform the method according to any one of the third aspect and the possible implementations of the third aspect; the computer is enabled to perform the method according to any one of the fourth aspect and the possible implementations of the fourth aspect; the computer is enabled to perform the method according to any one of the fifth aspect and the possible implementations of the fifth aspect; or the computer is enabled to perform the method according to any one of the sixth aspect and the possible implementations of the sixth aspect.

According to a fourteenth aspect, a computer program product is provided and includes instructions, where when the instructions are run on a computer, the computer is enabled to perform the method according to any one of the first aspect and the possible implementations of the first aspect; the computer is enabled to perform the method according to any one of the second aspect and the possible implementations of the second aspect; the computer is enabled to perform the method according to any one of the third aspect and the possible implementations of the third aspect; the computer is enabled to perform the method according to any one of the fourth aspect and the possible implementations of the fourth aspect; the computer is enabled to perform the method according to any one of the fifth aspect and the possible implementations of the fifth aspect; or the computer is enabled to perform the method according to any one of the sixth aspect and the possible implementations of the sixth aspect.

According to a fifteenth aspect, a communication apparatus is provided and includes a processor, where the processor is coupled to a memory, and the processor is configured to execute a computer program or instructions, so that the communication apparatus is enabled to perform the method according to any one of the first aspect and the possible implementations of the first aspect; the computer is enabled to perform the method according to any one of the second aspect and the possible implementations of the second aspect; the computer is enabled to perform the method according to any one of the third aspect and the possible implementations of the third aspect; the computer is enabled to perform the method according to any one of the fourth aspect and the possible implementations of the fourth aspect; the computer is enabled to perform the method according to any one of the fifth aspect and the possible implementations of the fifth aspect; or the computer is enabled to perform the method according to any one of the sixth aspect and the possible implementations of the sixth aspect.

According to a sixteenth aspect, a communication apparatus is provided and includes a logic circuit and an input/output interface, where the logic circuit is configured to execute a computer program or instructions, so that the communication apparatus is enabled to perform the method according to any one of the first aspect and the possible implementations of the first aspect; the computer is enabled to perform the method according to any one of the second aspect and the possible implementations of the second aspect; the computer is enabled to perform the method according to any one of the third aspect and the possible implementations of the third aspect; the computer is enabled to perform the method according to any one of the fourth aspect and the possible implementations of the fourth aspect; the computer is enabled to perform the method according to any one of the fifth aspect and the possible implementations of the fifth aspect; or the computer is enabled to perform the method according to any one of the sixth aspect and the possible implementations of the sixth aspect.

DESCRIPTION OF EMBODIMENTS

The following describes technical solutions of embodiments in this application with reference to accompanying drawings.

The technical solutions in embodiments of this application may be applied to various communication systems, such as a global system for mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a $5^{th}$ generation (5G) system or a new radio (NR) system, and a $6^{th}$ generation (6G) system.

Figure 1:
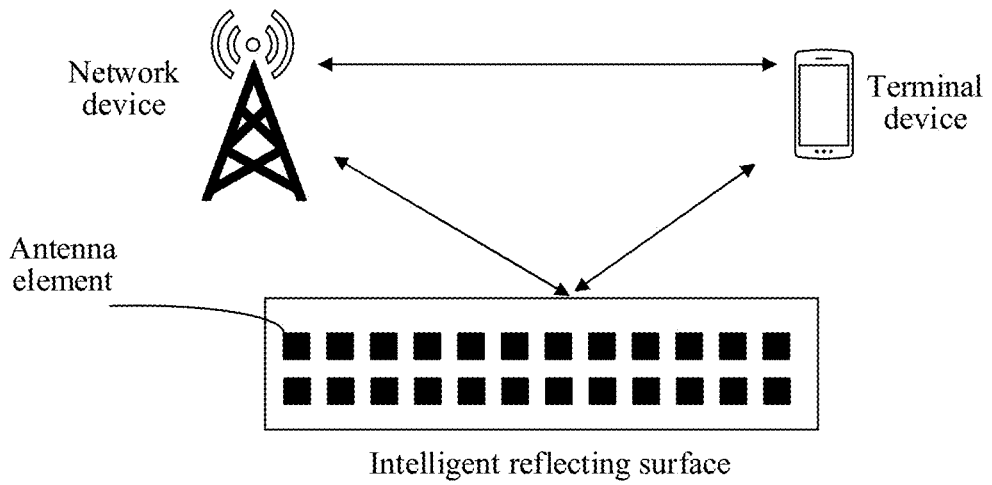
FIG. 1 is a diagram of a communication system architecture according to an embodiment of this application.

FIG. 1 is a diagram of a communication system architecture according to an embodiment of this application. The communication system architecture includes a terminal, a network device, and an intelligent reflecting surface (RIS). In FIG. 1, the network device may communicate with the terminal by using the intelligent reflecting surface, or may directly communicate with the terminal. The terminal may communicate with the network device by using the intelligent reflecting surface, or may directly communicate with the network device. A quantity of terminals, a quantity of network devices, and a quantity of intelligent reflecting surfaces in the communication system architecture are not limited in embodiments of this application.

A terminal in embodiments of this application may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future 6G network, a terminal in a public land mobile network (PLMN), or the like. This is not limited in embodiments of this application.

The network device in embodiments of this application may be a device configured to communicate with the terminal. The network device may be a base station (BTS) in a global system for terminal communication or code division multiple access, or may be a base station (NodeB, NB) in a wideband code division multiple access system, or may be an evolved NodeB (eNB, or eNodeB) in an LTE system, or may be a radio controller in a cloud radio access network (CRAN) scenario. Alternatively, the network device may be a relay station, an access point, a vehicle-mounted device, a wearable device, a network device in a 5G network, a network device in a future 6G network, a network device in a PLMN network, or the like. This is not limited in embodiments of this application.

It should be understood that the intelligent reflecting surface includes an intelligent panel including a plurality of antenna elements, and each antenna element is a passive reflecting component with low costs. By flexibly configuring an amplitude and a phase of each antenna element, radio channel fading can be controlled, and an expected directional beam can be formed.

Advantages of the intelligent reflecting surface may be summarized as follows.

(1) Enhanced spectral efficiency: The intelligent reflecting surface provides a new degree of freedom that can be changed. By intelligently controlling the antenna element, the intelligent reflecting surface can further improve communication quality of a radio link, enhance useful signal strength at a receiving end, reduce channel interference strength, and provide a breakthrough point for implementation of an overall intelligent network in the future.

(2) Reduced energy consumption and device complexity: The intelligent reflecting surface only needs to passively reflect a received signal, in other words, a transmit unit and a receiving unit do not need to be configured at an intelligent reflecting surface end, and data does not need to be encoded or decoded. Therefore, complexity of a hardware device of the intelligent reflecting surface can be greatly reduced, to reduce system energy consumption of a wireless network.

(3) Easy deployment: The intelligent reflecting surface can be easily deployed on the surface of various buildings, or may be deployed on devices such as indoor walls, platforms, roadside billboards, high-speed road-boards, and vehicle windows because only passive electromagnetic components are included. In addition, the intelligent reflecting surface can be removed or redeployed at any time depending on needs of a network.

(4) Compatibility: The intelligent reflecting surface can be considered as a supplementary device of an existing network. Therefore, the intelligent reflecting surface does not affect an existing protocol, and an existing device does not need to be changed, so that the intelligent reflecting surface has compatibility.

(5) Full-duplex: Compared with a relay system running in a half-duplex mode, an intelligent reflecting surface only performs passive reflection. Therefore, the intelligent reflecting surface can run in a full-duplex mode to improve spectral efficiency.

An orientation of the terminal may be determined by measuring an angle of arrival (AoA). The AoA may be specifically determined based on a multiple signal classification (MUSIC) algorithm. The MUSIC algorithm is an algorithm based on subspace decomposition, and uses orthogonality of signal subspace and noise subspace to construct a spatial spectral function and estimates a signal parameter through peak search. However, in a long-distance scenario, even a small AoA measurement error may cause a large deviation for measuring the orientation of the terminal. In addition, in a scenario including the intelligent reflecting surface, because peak search needs to be performed at a signal receiving end in an existing angle estimation method, and the intelligent reflecting surface includes only a passive reflecting component and does not have a signal processing function, the existing angle estimation technology cannot be used to measure the orientation of the terminal.

In addition, pilot overheads required by an existing channel estimation algorithm are related to a quantity of antenna elements of a terminal device or a network device. After the intelligent reflecting surface is introduced, an excessively large quantity of antenna elements included in the intelligent reflecting surface causes a sharp increase in the pilot signal overheads.

In view of the foregoing technical problem, embodiments of this application provide a communication method and a communication apparatus, to complete high-precision measurement of an orientation of the terminal in the scenario including the intelligent reflecting surface, and reduce the pilot signal overheads of the channel estimation algorithm.

The following further describes the communication method provided in embodiments of this application with reference to the accompanying drawings.

Figure 2:
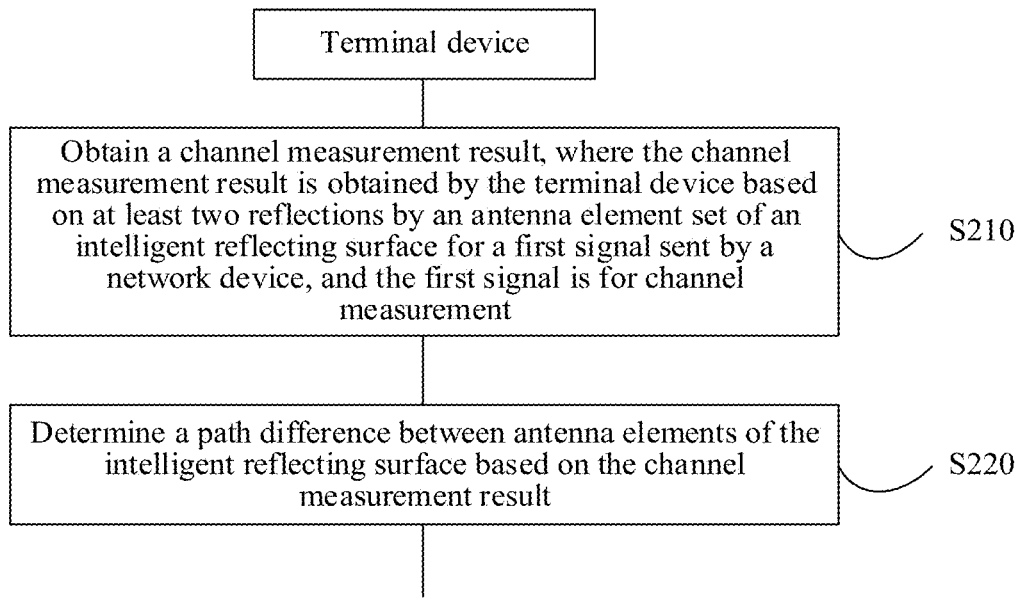
FIG. 2 is a schematic flowchart of a communication method according to an embodiment of this application.

FIG. 2 is a schematic flowchart of a communication method according to an embodiment of this application. The method includes the following steps.

S210: A terminal device obtains a channel measurement result, where the channel measurement result is obtained by the terminal device based on at least two reflections by an antenna element set of an intelligent reflecting surface for a first signal sent by a network device, and the first signal is for channel measurement.

The antenna element set for channel measurement includes at least two antenna elements. The antenna element set is the antenna elements that are in the intelligent reflecting surface and that participate in reflecting the first signal. In addition to the antenna element set, the intelligent reflecting surface may further include at least one antenna element for data transmission. A quantity of antenna elements included in the antenna element set may be determined in a pre-configuration manner. For example, the intelligent reflecting surface includes 100 antenna elements, and 10 of the antenna elements may be preconfigured to reflect the first signal sent by the network device to the intelligent reflecting surface.

It should be understood that the first signal is for channel measurement. The first signal may be a downlink channel measurement signal, or may be a downlink pilot signal, for example, a channel state information reference signal (CRI-RS), a sounding reference signal (SRS), or a demodulation reference signal (DMRS), or may be another signal, for example, an intelligent reflecting surface signal.

The channel measurement result obtained by the terminal device based on the at least two reflections by the antenna element set of the intelligent reflecting surface for the first signal may be understood as follows: The terminal device may obtain one channel measurement result based on the first signal sent by the network device each time, and each channel measurement result is obtained based on reflection performed by the antenna element set of the intelligent reflecting surface. In other words, the network device sends the first signal at least twice, and each channel measurement result corresponds to one reflection. The channel measurement result may be represented as follows as a whole:

$$Y^n = g_n * s + n_n \qquad (1)$$

$Y^n$ represents the $n^{th}$ channel measurement result determined by the terminal device based on the $n^{th}$ reflection by the antenna element set for the first signal, and n is a positive integer. $g_n$ represents a channel between the network device and the terminal device when the network device sends the first signal the $n^{th}$ time. s represents the first signal. $n_n$ represents noise in the $n^{th}$ reflection process. It is assumed that $n_1=n_2= \ldots =n_n$, in other words, the noise may be considered as the same, or a variation part of the noise in a plurality of reflection processes may be ignored.

$g_n$ may be expressed as:

$$g_n = |g_{d_0}|e^{-jkd_0} + \sum_n |g_{d_1}||g_{d_2}|e^{-jk(d_1+d_2+(n-1)*\Delta)}e^{-j\varphi_n} \qquad (2)$$

$|g_{d_0}|$ and $e^{-jkd_0}$ are respectively an amplitude response and a phase response of a direct link between the network device and the terminal device. $|g_{d_1}|*|g_{d_2}|$ and $e^{-jk(d_1+d_2)}$ are respectively an amplitude response and a phase response of a reflection link from the network device to the intelligent reflecting surface to the terminal device. $k=2\pi/\lambda$, and $\lambda$ represents a wavelength. $e^{-j\varphi_n}$ is an adjustable phase response (which may also be understood as a phase of the $n^{th}$ antenna element) of the $n^{th}$ antenna element in the antenna element set. $d_0$ is a transmission path between the network device and the terminal device, $d_1$ is a transmission path from the network device to an antenna element #A in the antenna element set, and $d_2$ is a transmission path from the terminal device to the antenna element #A in the antenna element set. $\Delta$ is a path difference between adjacent antenna elements in the antenna element set. For example, the transmission path from the terminal device to the antenna element #A to the network device is $\Delta_1=d_1+d_2$. A transmission path from the terminal device to an antenna element #B (the antenna element #B is adjacent to the antenna element #A) to the network device is: $\Delta_2=d_1+\mu*\sin\theta_1+d_2-\mu*\sin\theta_1$. A path difference between the antenna element #A and the antenna element #B may be represented as:

$$\Delta = \Delta_2 - \Delta_1 = \qquad (3)$$
$$(d_1 + \mu*\sin\theta_1 + d_2 - \mu*\sin\theta_1) - d_1 + d_2 = \mu*(\sin\theta_1 - \sin\theta_2)$$

Therefore, a transmission path that passes through the $n^{th}$ antenna element of the intelligent reflecting surface is $d_1+d_2+(n-1)*\Delta$. A path difference between the $n^{th}$ antenna element of the intelligent reflecting surface and the antenna element #A is $(n-1)*\Delta$. $\mu$ is a distance between adjacent antenna elements in the antenna element set of the intelligent reflecting surface, $\theta_1$ is an included angle between the network device and the antenna element #A in the antenna element set, and $\theta_2$ is an included angle between the terminal device and the antenna element #A in the antenna element set.

It should be understood that an included angle between the network device and any antenna element of the intelligent reflecting surface is the same (which is $\theta_1$). An included angle between the terminal device and any antenna element of the intelligent reflecting surface is the same (which is $\theta_2$).

Figure 3:
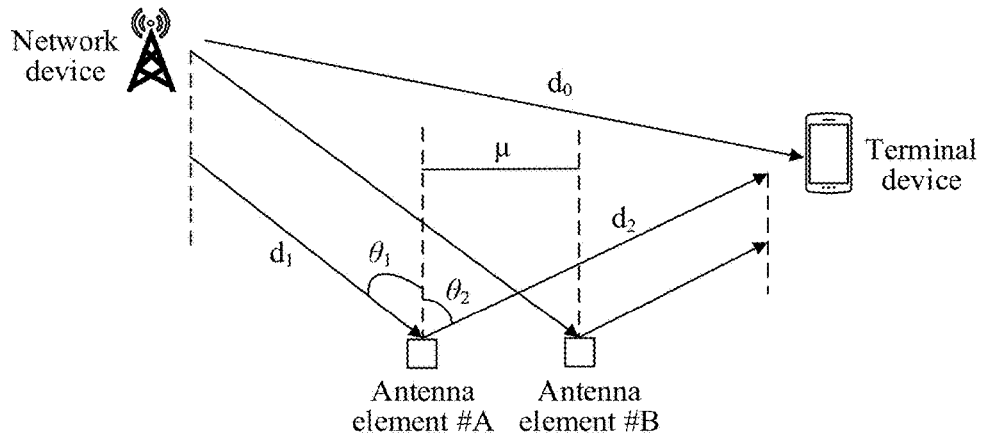
FIG. 3 is a diagram of measuring a path difference between antenna elements of an intelligent reflecting surface according to an embodiment of this application.

FIG. 3 is a diagram of measuring a path difference between antenna elements according to an embodiment of this application. Parameters shown in FIG. 3 have been described above, and details are not described herein again.

It should be understood that the antenna element #A is any antenna element in the antenna element set, the antenna element #B is any antenna element in the antenna element set, and the antenna element #A is adjacent to the antenna element #B.

It should be understood that the channel measurement result obtained by the terminal device based on the at least two reflections by the antenna element set of the intelligent reflecting surface for the first signal sent by the network device may also be understood as a channel measurement result obtained by performing a corresponding operation on at least two channel measurement results.

For example, when the antenna element set of the intelligent reflecting surface reflects the first signal twice, the channel measurement result may be understood as:

$$\text{Channel measurement result} = Y^1 * (Y^2) * \text{ or } \frac{Y^2}{Y^1}.$$

For another example, when the antenna element set of the intelligent reflecting surface reflects the first signal three times, the channel measurement result may be understood as: Channel measurement result=$(Y^1-Y^2)*(Y^1-Y^3)*(Y^1-Y^3)*$ is a conjugate expression form of $(Y^1-Y^3)$.

S220: The terminal device determines a path difference between the antenna elements of the intelligent reflecting surface based on the channel measurement result.

Specifically, when the antenna element set of the intelligent reflecting surface reflects the first signal twice, channel measurement results corresponding to the two reflections are $Y^1$ and $Y^2$ respectively. When the antenna element set of the intelligent reflecting surface reflects the first signal three times, channel measurement results corresponding to the three reflections are $Y^1$, $Y^2$, and $Y^3$ respectively.

For example, the terminal device determines the path difference between the antenna elements of the intelligent reflecting surface based on a first channel measurement result and a second channel result. For example, an adjustable phase response of each antenna element in the antenna element set is $e^{-j\varphi_n}=1$, a direct link between the terminal device and the network device is blocked, and a noise part is 0, or the noise is very small and can be ignored.

It should be understood that, in embodiments of this application, for each antenna element index number in the antenna element set that is of the intelligent reflecting surface and that is for channel measurement, one antenna element corresponds to one index number, and the index number is odd or even. For example, there is an antenna element with an even index number and an antenna element with an odd index number, for example, an antenna element with an odd index number value that satisfies 2i+1 and an antenna element with an even index number value satisfies 2i, where i is a natural number. It should be understood that the index number is associated with a specific arrangement location of the antenna element of the intelligent reflecting surface.

It should be understood that a spacing between the antenna elements of the intelligent reflecting surface is even.

In a possible implementation, the antenna element set for channel measurement includes a first antenna element set and a second antenna element set. The first antenna element set includes at least one first antenna element, and the second antenna element set includes at least one second antenna element.

It should be understood that a quantity of first antenna elements included in the first antenna element set is the same as a quantity of second antenna elements included in the second antenna element set. Each first antenna element in the first antenna element set is in one-to-one correspondence with each second antenna element in a corresponding location in the second antenna element set. A spacing between antenna elements in each group that are in one-to-one correspondence is equal. The correspondence is specifically shown below.

For example, the first antenna element may be an antenna element with an odd index number in the antenna element set, and the second antenna element may be an antenna element with an even index number in the antenna element set.

For example, the antenna element set includes 10 antenna elements, and index number values of the 10 antenna elements are respectively 1 to 10. The first antenna element set includes five first antenna elements whose index numbers are 1, 3, 5, 7, and 9, and the second antenna element set includes five second antenna elements whose index numbers are 2, 4, 6, 8, and 10. Therefore, the antenna element whose index number is 1 corresponds to the antenna element whose index number is 2, the antenna element whose index number is 3 corresponds to the antenna element whose index number is 4, the antenna element whose index number is 5 corresponds to the antenna element whose index number is 6, the antenna element whose index number is 7 corresponds to the antenna element whose index number is 8, and the antenna element whose index number is 9 corresponds to the antenna element whose index number is 10. A spacing between antenna elements in each group that are in one-to-one correspondence is equal. To be specific, a path difference between the antenna element whose index number is 1 and the antenna element whose index number is 2, a path difference between the antenna element whose index number is 3 and the antenna element whose index number is 4, a path difference between the antenna element whose index number is 5 and the antenna element whose index number is 6, a path difference between the antenna element whose index number is 7 and the antenna element whose index number is 8, and a path difference between the antenna element whose index number is 9 and the antenna element whose index number is 10 are all equal.

For another example, the first antenna element may be an antenna element with a first half of index numbers in the antenna element set, and the second antenna element may be an antenna element with a second half of index numbers in the antenna element set.

For example, the antenna element set includes 10 antenna elements, and index number values of the 10 antenna elements are respectively 1 to 10. The first antenna element set includes five antenna elements whose index numbers are 1 to 5, and the five antenna elements may all be referred to as first antenna elements. The second antenna element set includes five antenna elements whose index numbers are 6 to 10, and the five antenna elements may all be referred to as second antenna elements. Therefore, the antenna element whose index number is 1 corresponds to the antenna element whose index number is 6, the antenna element whose index number is 2 corresponds to the antenna element whose index number is 7, the antenna element whose index number is 3 corresponds to the antenna element whose index number is 8, the antenna element whose index number is 4 corresponds to the antenna element whose index number is 9, and the antenna element whose index number is 5 corresponds to the antenna element whose index number is 10. In addition, a path difference between the antenna element whose index number is 1 and the antenna element whose index number is 6, a path difference between the antenna element whose index number is 2 and the antenna element whose index number is 7, a path difference between the antenna element whose index number is 3 and the antenna element whose index number is 8, a path difference between the antenna element whose index number is 4 and the antenna element whose index number is 9, and a path difference between the antenna element whose index number is 5 and the antenna element whose index number is 10 are all equal, and is five times the size of a path difference between adjacent antenna elements.

This is not specifically limited in embodiments of this application provided that it is ensured that the spacing between the antenna elements in each group that are in one-to-one correspondence and that are respectively in the first antenna element set and the second antenna element set is a same value.

It should be understood that an index number of an antenna element participating in the first reflection corresponds to an index number of an antenna element participating in the second reflection, and a quantity of antenna elements participating in each reflection is the same. For example, if index number values of antenna elements participating in the first reflection are 1, 3, and 5 respectively, index number values of antenna elements participating in the second reflection are 2, 4, and 6 respectively.

With reference to formula (1) and formula (2), when the first antenna element set includes the antenna element with the odd index number, and the second antenna element set includes the antenna element with the even index number, it can be known that:

$$Y^1 = g_n * s + n_1 = s * \sum_{n \text{ is odd}} |g_{d_1}||g_{d_2}|e^{-jk(d_1+d_2+(n-1)*\Delta)} \quad (4)$$

$$Y^2 = g_n * s + n_2 = s * \sum_{n \text{ is even}} |g_{d_1}||g_{d_2}|e^{-jk(d_1+d_2+(n-1)*\Delta)} \quad (5)$$

A conjugate of $Y^2$ is represented as:

$$(Y^2)* = s * \sum_{n \text{ is even}} |g_{d_1}||g_{d_2}|e^{-jk(d_1+d_2+(n-1)*\Delta)} \quad (6)$$

In this case, a product of $Y^1$ and $(Y^2)*$ may be represented as:

$$Y^1 * (Y^2)* = \frac{(2|g_{d_1}||g_{d_2}|s)^2 e^{-jk(d_1+d_2)} \left(\sum_{n \text{ is odd}} e^{-jk(n-1)*\Delta}\right)}{e^{jk(d_1+d_2)} \left(\sum_{n \text{ is even}} e^{jk(n-1)*\Delta}\right)} \quad (7-1)$$

$$= \frac{(2|g_{d_1}||g_{d_2}|s)^2 \left(\sum_{n \text{ is odd}} e^{-jk(n-1)*\Delta}\right) e^{jk\Delta}}{\left(\sum_{n \text{ is odd}} e^{jk(n-1)*\Delta}\right)}$$

$$= \frac{(2|g_{d_1}||g_{d_2}|s)^2 e^{-jk\Delta} \left(\sum_{n \text{ is odd}} e^{-jk(n-1)*\Delta}\right)*}{\left(\sum_{n \text{ is odd}} e^{jk(n-1)*\Delta}\right)}$$

Alternatively, a result of dividing $Y^2$ by $Y^1$ may be represented as:

$$\frac{Y^2}{Y^1} = e^{-jk\Delta} \quad (7-2)$$

Therefore, the channel measurement result in step S220 may be understood as $Y^1*(Y^2)*$ or $$\frac{Y^2}{Y^1}.$$

The terminal device may determine that a phase of the channel measurement result is $e^{jk\Delta}$ or $e^{-jk\Delta}$, and then determine the path difference between the antenna elements of the intelligent reflecting surface.

For another example, the terminal device determines the path difference between the antenna elements of the intelligent reflecting surface based on the first channel measurement result, the second channel result, and a third channel measurement result.

In the first reflection, phase responses of antenna elements in the antenna element set are all $e^{-j\varphi_n}=1$.

In the second reflection, phase responses of antenna elements with odd index numbers in the antenna element set are all $e^{-j\varphi_n}=1$, and phase responses of antenna elements with even index numbers are all $e^{-j\varphi_n}=1$.

In the third reflection, phase responses of the antenna elements with the odd index numbers in the antenna element set are all $e^{-j\varphi_n}=1$, and phase responses of the antenna elements with the even index numbers are all $e^{-j\varphi_n}=1$.

In addition, in the foregoing three reflection processes, the antenna element participating in the first reflection also participates in the second reflection and the third reflection.

The first channel measurement result may be represented as:

$$Y^1 = \left(|g_{d_0}|e^{-jkd_0} + \sum_n |g_{d_1}||g_{d_2}|e^{-jk(d_1+d_2+(n-1)*\Delta)}\right)*s + n_1 \quad (8)$$

The second channel measurement result may be represented as:

$$Y^2 = \left(|g_{d_0}|e^{-jkd_0} + \sum_{n \text{ is even}} |g_{d_1}||g_{d_2}|e^{-jk(d_1+d_2+(n-1)*\Delta)} - \sum_{n \text{ is odd}} |g_{d_1}||g_{d_2}|e^{-jk(d_1+d_2+(n-1)*\Delta)}\right)*s + n_2 \quad (9)$$

The third channel measurement result may be represented as:

$$Y^3 = \left(|g_{d_0}|e^{-jkd_0} - \sum_{n \text{ is even}} |g_{d_1}||g_{d_2}|e^{-jk(d_1+d_2+(n-1)*\Delta)} + \sum_{n \text{ is odd}} |g_{d_1}||g_{d_2}|e^{-jk(d_1+d_2+(n-1)*\Delta)}\right)*s + n_3 \quad (10)$$

When $n_1=n_2=n_3$, the second channel measurement result is subtracted from the first channel measurement result, to obtain:

$$Y^1 - Y^2 = \left(2\sum_{n \text{ is odd}} |g_{d_1}||g_{d_2}|e^{-jk(d_1+d_2+(n-1)*\Delta)}\right)s \quad (11)$$

The third channel measurement result is subtracted from the first channel measurement result, which may obtain:

$$Y^1 - Y^3 = \left(2\sum_{n \text{ is even}} |g_{d_1}||g_{d_2}|e^{-jk(d_1+d_2+(n-1)*\Delta)}\right)s \quad (12)$$

A conjugate of $Y^1-Y^3$ is represented as:

$$(Y^1 - Y^3)^* = \left(2\sum\nolimits_{n \text{ is even}} |g_{d_1}||g_{d_2}|e^{jk(d_1+d_2+(n-1)*\Delta)}\right)s \quad (13)$$

$(Y^1-Y^2)$ is multiplied by $(Y^1-Y^3)^*$ to obtain:

$$(Y^1 - Y^2)*(Y^1 - Y^3)^* = \left(2|g_{d_1}||g_{d_2}|s\sum\nolimits_{n \text{ is odd}} e^{-jk(d_1+d_2+(n-1)*\Delta)}\right) \quad (14)$$

$$2|g_{d_1}||g_{d_2}|s\sum\nolimits_{n \text{ is even}} e^{jk(d_1+d_2+(n-1)*\Delta)}) = (2|g_{d_1}||g_{d_2}|s)^2$$

$$e^{jk(d_1+d_2)}\left(\sum\nolimits_{n \text{ is odd}} e^{jk(n-1)*\Delta}\right)e^{jk(d_1+d_2)}\left(\sum\nolimits_{n \text{ is odd}} e^{jk(n-1)*\Delta}\right) =$$

$$(2|g_{d_1}||g_{d_2}|s)^2\left(\sum\nolimits_{n \text{ is odd}} e^{jk(n-1)*\Delta}\right)e^{jk\Delta}\left(\sum\nolimits_{n \text{ is odd}} e^{jk(n-1)*\Delta}\right) =$$

$$(2|g_{d_1}||g_{d_2}|s)^2 e^{jk\Delta}\left(\sum\nolimits_{n \text{ is odd}} e^{-jk(n-1)*\Delta}\right)\left(\sum\nolimits_{n \text{ is odd}} e^{jk(n-1)*\Delta}\right)$$

Therefore, the channel measurement result in step S220 may be understood as $(Y^1-Y^2)*(Y^1-Y^3)^*$. The terminal device may determine that a phase of the channel measurement result is $e^{jk\Delta}$, and then determine the path difference between the antenna elements.

It should be understood that a sequence of the foregoing reflection process may also be adjusted. For example, a phase $e^{jk\Delta}$ may also be obtained by exchanging the second reflection and the third reflection, and a remaining process is the same as the foregoing process. Alternatively, a sequence of the foregoing reflection process may be adjusted in another manner. For example, the first reflection and the second reflection are exchanged, and specific logic is the same as that described above.

It should be understood that the path difference between the antenna elements may be a path difference between adjacent antenna elements, or may be a path difference between non-adjacent antenna elements. For example, if a path difference between the antenna element whose index number value is 1 and the antenna element whose index number value is 3 is $2\Delta$, the path difference between the adjacent antenna elements (namely, the antenna element whose index number value is 1 and the antenna element whose index number value is 2) may be determined based on $2\Delta$, and the path difference between the antenna element whose index number value is 1 and the antenna element whose index number value is 2 is the same as a path difference between the antenna element whose index number value is 2 and the antenna element whose index number value is 3. Therefore, the path difference between the antenna elements may include two cases: the path difference between the adjacent antenna elements and the path difference between non-adjacent antenna elements.

It should be understood that, when the antenna element set of the intelligent reflecting surface reflects the first signal four times or more, the terminal device may still determine the path difference between the antenna elements of the intelligent reflecting surface according to the foregoing formula (7) to formula (13).

It should be understood that, the terminal device determines the path difference based on the channel measurement result determined based on the at least two reflections by the antenna element set of the intelligent reflecting surface for the first signal sent by the network device, and may determine an orientation of the terminal device with high precision based on the path difference. In other words, the path difference determined by the terminal device can be used to position a location of the terminal device.

Specifically, when the orientation of the terminal device is positioned with high precision, the terminal device may determine, based on the path difference, an angle between the terminal device and the intelligent reflecting surface and/or an angle between the network device and the intelligent reflecting surface, so that the orientation of the terminal device is determined with high precision based on the foregoing angles and an angle between the terminal device and the network device. In addition, after the path difference is determined, the angle between the terminal device and the intelligent reflecting surface and the angle between the network device and the intelligent reflecting surface may be determined based on a known location of the network device and a known location of the intelligent reflecting surface. Therefore, in embodiments of this application, the orientation of the terminal device can be simply determined based on the path difference with high precision.

According to the foregoing technical solutions, in embodiments of this application, high-precision measurement of the orientation of the terminal device can be completed in a scenario including the intelligent reflecting surface, and positioning precision can be improved.

In an example, the first antenna element set includes one first antenna element, the second antenna element set includes one second antenna element, and the formula (8) is simplified as follows:

$$Y^1 = \left(|g_{d_0}|e^{-jkd_0} + |g_{d_1}||g_{d_2}|e^{-jk(d_1+d_2)} + |g_{d_1}||g_{d_2}|e^{-jk(d_1+d_2+\Delta)}\right)*s + n_1$$

Formula (9) is simplified as follows:

$$Y^2 = \left(|g_{d_0}|e^{-jkd_0} - |g_{d_1}||g_{d_2}|e^{-jk(d_1+d_2)} + |g_{d_1}||g_{d_2}|e^{-jk(d_1+d_2+\Delta)}\right)*s + n_2$$

Formula (10) is simplified as follows:

$$Y^3 = \left(|g_{d_0}|e^{-jkd_0} + |g_{d_1}||g_{d_2}|e^{-jk(d_1+d_2)} - |g_{d_1}||g_{d_2}|e^{-jk(d_1+d_2+\Delta)}\right)*s + n_3$$

Formula (14) is simplified as follows:

$$(Y^1 - Y^2)*(Y^1 - Y^3)^* =$$
$$(2|g_{d_1}||g_{d_2}|s)^2 e^{-jk(d_1+d_2)}e^{jk(d_1+d_2)}e^{jk\Delta} = (2|g_{d_1}||g_{d_2}|s)^2 e^{jk\Delta}$$

It should be understood that the first antenna element set and the second antenna element set correspond to different phases in the at least two reflections. Specifically, the different phases may include any one of the following groups: the first antenna element set corresponds to a first phase, and the second antenna element set corresponds to the first phase; the first antenna element set corresponds to a first phase, and the second antenna element set corresponds to a second phase; the first antenna element set corresponds to a second phase, and the second antenna element set corresponds to a first phase; or the first antenna element set corresponds to a second phase, and the second antenna element set corresponds to the second phase. The first phase is different from the second phase.

The first phase is an odd multiple of $\pi$, and the second phase is an even multiple of $\pi$; or the first phase is an even multiple of $\pi$, and the second phase is an odd multiple of $\pi$. For example, the first phase is the odd multiple of $\pi$, and $e^{-j\varphi n}=-1$ in this case; the second phase is the even multiple of π, and $e^{-j\varphi n}=1$ in this case. It should be understood that both the odd number and the even number include positive and negative numbers. The first phase and the second phase may alternatively be another phase value. For example, a difference between the first phase and the second phase is an odd multiple of π. This is not limited in embodiments of this application.

In embodiments of this application, a phase of an antenna element set in each reflection process is adjusted, and the path difference between the antenna elements of the intelligent reflecting surface is determined based on a plurality of obtained channel measurement results. In addition, a positioning result of the terminal device with high precision may be further obtained based on the path difference, and an estimation result of a channel from the terminal device to the intelligent reflecting surface and then to the network device is obtained in a manner with low pilot signal overheads.

It should be understood that the technical solution shown in FIG. 2 may be executed by the network device. Specifically, a channel measurement result obtained by the network device is obtained by the network device based on at least two reflections by the intelligent reflecting surface for a first signal sent by the terminal device, and the path difference of the antenna element of the intelligent reflecting surface is determined based on the channel measurement result. Specific steps are consistent with the foregoing descriptions, and details are not described herein again.

The first signal sent by the terminal device to the intelligent reflecting surface is also for channel measurement. The first signal may be an uplink channel measurement signal, or may be an uplink pilot signal, for example, a CRI-RS, an SRS, or a DMRS, or may be another signal, for example, an intelligent reflecting surface signal.

It should be understood that the channel measurement is equivalent to channel estimation. This is uniformly described herein, and is not described in the following.

It should be understood that after determining the path difference between the antenna elements of the intelligent reflecting surface, the network device may determine a channel estimation result of channels of the antenna elements of the intelligent reflecting surface based on the path difference.

For example, if all antenna elements of the intelligent reflecting surface are disabled, a channel between the network device and the terminal device may be represented, through the fourth channel measurement, as follows:

$$g_4 = |g_{d_0}|e^{-jkd_0} \quad (15\text{-}1)$$

If antenna elements except the 1$^{st}$ antenna element of the intelligent reflecting surface are disabled, in other words, there is only one antenna element in the antenna element set of the intelligent reflecting surface, a channel between the network device and the terminal device may be represented, through the fifth channel measurement, as follows:

$$g_5 = |g_{d_0}|e^{-jkd_0} + |g_{d_1}||g_{d_2}|e^{-jk(d_1+d_2)}e^{-j\varphi_1} \quad (15\text{-}2)$$

The terminal device may determine $$|g_{d_1}||g_{d_2}|e^{-jk(d_1+d_2)}e^{-j\varphi_1}$$

based on the fourth channel measurement and the fifth channel measurement, where $e^{-j\varphi_1}$ is a known parameter. The terminal device may further obtain the estimation result of the channel from the terminal device to the intelligent reflecting surface and then to the network device based on the path difference that corresponds to the intelligent reflecting surface and that is obtained through first three pieces of measurement.

For example, there are two antenna elements in the antenna element set of the intelligent reflecting surface, and the terminal device may determine the channel between the network device and the terminal device based on the fourth channel measurement, the fifth channel measurement, and the path difference, and the channel may be represented as:

$$H_2 = \quad (16)$$
$$|g_{d_0}|e^{-jkd_0} + |g_{d_1}||g_{d_2}|e^{-jk(d_1+d_2)}e^{-j\varphi_1} + |g_{d_1}||g_{d_2}|e^{-jk(d_1+d_2+\Delta)}e^{-j\varphi_2}$$

For example, there are three antenna elements in the antenna element set of the intelligent reflecting surface, where $e^{-j\varphi_1}$, $e^{-j\varphi_2}$, and $e^{-j\varphi_3}$ are known parameters, and the channel between the network device and the terminal device may be represented as:

$$H_3 = |g_{d_0}|e^{-jkd_0} + |g_{d_1}||g_{d_2}|e^{-jk(d_1+d_2)}e^{-j\varphi_1} + \quad (17)$$
$$|g_{d_1}||g_{d_2}|e^{-jk(d_1+d_2+\Delta)}e^{-j\varphi_2} + |g_{d_1}||g_{d_2}|e^{-jk(d_1+d_2+2\Delta)}e^{-j\varphi_3}$$

Further, when there are more than three antenna elements in the antenna element set of the intelligent reflecting surface, the channel between the network device and the terminal device may be represented as:

$$H_n = |g_{d_0}|e^{-jkd_0} + \sum_n |g_{d_1}||g_{d_2}|e^{-jk(d_1+d_2+(n-1)*\Delta)}e^{-j\varphi_n} \quad (18)$$

Therefore, the terminal device may determine the channel estimation result of the antenna elements of the intelligent reflecting surface based on the foregoing formula (15) to formula (18). In this way, the terminal device may further determine, based on the path difference, the estimation result of the channel from the terminal device to the intelligent reflecting surface and then to the network device in the manner with the low pilot signal overheads.

Figure 4:
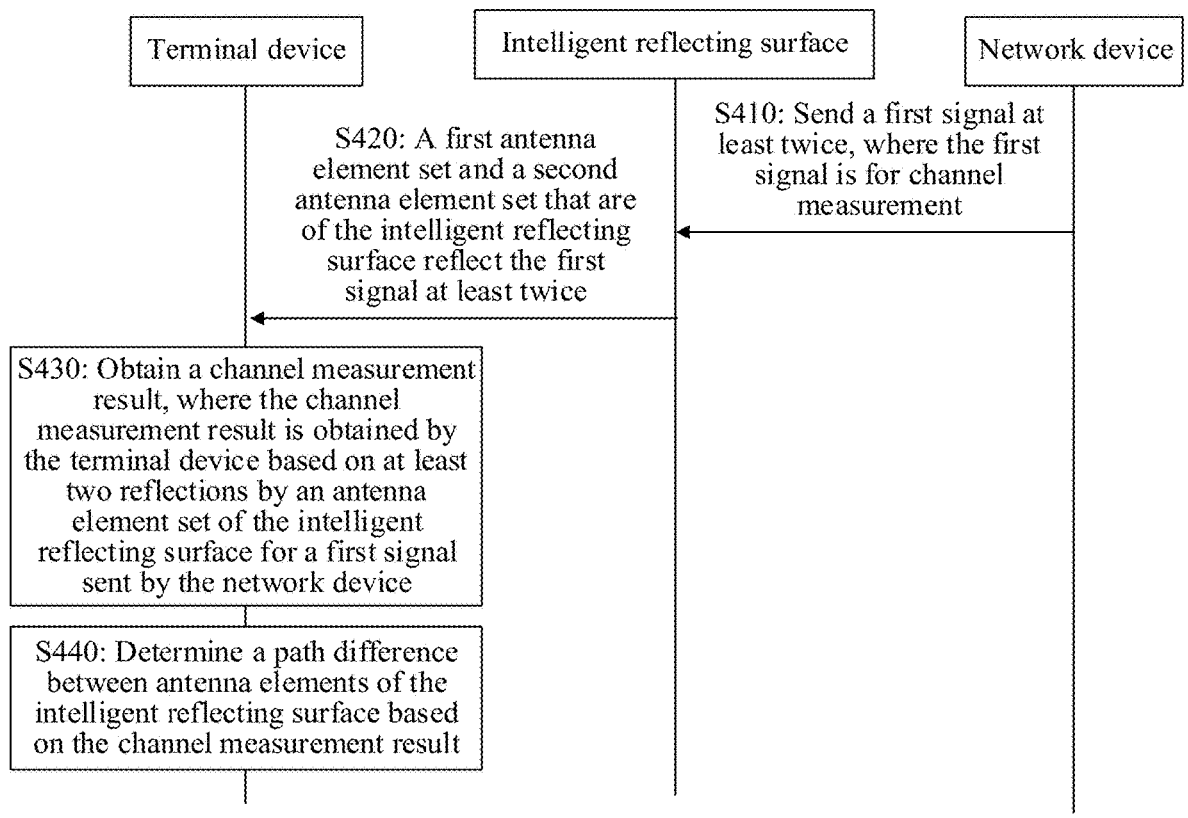
FIG. 4 is a schematic flowchart of a communication method according to an embodiment of this application.

The following further describes the solution shown in FIG. 3 with reference to FIG. 4.

FIG. 4 is a schematic flowchart of a communication method according to an embodiment of this application. The method includes the following steps.

S410: A network device sends a first signal to an intelligent reflecting surface at least twice.

S420: A first antenna element set and a second antenna element set that are of the intelligent reflecting surface reflect the first signal at least twice.

For example, the first antenna element set and the second antenna element set reflect the first signal three times, and each reflection corresponds to a different phase. For example, in the first reflection, the first antenna element set corresponds to a first phase, and the second antenna element set corresponds to the first phase; in the second reflection, the first antenna element set corresponds to the first phase, and the second antenna element set corresponds to a second phase; and in the third reflection, the first antenna element set corresponds to the second phase, and the second antenna element set corresponds to the first phase. The first phase is π, and the second phase is 2π.

S430 is the same as S210.

S440 is the same as S220.

For specific descriptions of step S430 and step S440, refer to content of the foregoing steps S210 and S220. Details are not described herein again.

It should be understood that, a terminal device determines a path difference based on a channel measurement result determined based on at least two reflections by an antenna element set of the intelligent reflecting surface for the first signal sent by the network device, and may determine an orientation of the terminal device with high precision based on the path difference. In other words, the path difference determined by the terminal device can be used to position a location of the terminal device.

Specifically, when the orientation of the terminal device is positioned with high precision, the path difference is a core feature. For example, the terminal device may determine, based on the path difference, an angle between the terminal device and the intelligent reflecting surface, and/or an angle between the network device and the intelligent reflecting surface, so that the orientation of the terminal device is determined with high precision based on the foregoing angles and an angle between the terminal device and the network device.

In addition, after the path difference is determined, the angle between the terminal device and the intelligent reflecting surface and the angle between the network device and the intelligent reflecting surface may be determined based on a known location of the network device and a known location of the intelligent reflecting surface. Therefore, in embodiments of this application, the orientation of the terminal device can be simply determined based on the path difference with the high precision, to complete high-precision measurement of the orientation of the terminal device, so that positioning precision can be improved.

It should be understood that the technical solution shown in FIG. 4 may alternatively be executed by the network device. Specifically, the terminal device sends the first signal to the intelligent reflecting surface at least twice (referring to S410), and the network device determines the channel measurement result (referring to S430) based on the at least two reflections (referring to S420) by the antenna element set of the intelligent reflecting surface for the first signal sent by the terminal device, and determines a path difference (referring to S440) between antenna elements of the intelligent reflecting surface based on the channel measurement result. A specific process is consistent with the foregoing process, and details are not described herein again.

It should be understood that a time-frequency code resource for uplink measurement (the network device determines the path difference) or downlink measurement (the terminal device determines the path difference) may be determined in a manner of predefinition, pre-configuration, or indication by the network device to the terminal device. Specific phase values such as the first phase and the second phase may also be determined in a manner of predefinition, pre-configuration, or indication by the network device to the intelligent reflecting surface.

In an embodiment, step S450 after step S440 includes at least one of the following steps.

S450 #A: The terminal device determines the angle between the network device and the intelligent reflecting surface based on the path difference.

S450 #B: The terminal device determines the angle between the terminal device and the intelligent reflecting surface based on the path difference.

It should be understood that the terminal device determines the angle (which may be referred to as a second angle) between the terminal device and the intelligent reflecting surface based on the path difference. For example, if the terminal device knows the location of the network device and the location of the intelligent reflecting surface, the terminal device may determine the angle between the network device and the intelligent reflecting surface based on the known location of the network device and the known location of the intelligent reflecting surface.

It should be understood that the path difference between the antenna elements of the intelligent reflecting surface is $\Delta$, and $$k\Delta = \frac{2\pi\Delta}{\lambda} = \frac{2\pi\mu}{\lambda}(\sin\theta_1 - \sin\theta_2) \tag{19}$$

For example, the location of the network device is $\{x_b, y_b\}$, and the location of the intelligent reflecting surface is $\{x_r, y_r\}$. The angle between the network device and the intelligent reflecting surface may be represented as:

$$\theta_1 = \arg\tan\left(\frac{x_b - x_r}{y_b - y_r}\right) \tag{20}$$

The angle between the terminal device and the intelligent reflecting surface may be represented as:

$$\theta_2 = \arg\sin\left(\sin\theta_1 - \frac{k\Delta\lambda}{2\pi\mu}\right) \tag{21}$$

Further, the terminal device may determine the angle between the terminal device and the intelligent reflecting surface based on the path difference and the angle between the network device and the intelligent reflecting surface. In this way, the location of the terminal device may be determined based on the angle between the terminal device and the intelligent reflecting surface.

Alternatively, the terminal device determines the angle between the terminal device and the intelligent reflecting surface based on the known location of the terminal device and the known location of the intelligent reflecting surface, and determines the angle between the network device and the intelligent reflecting surface based on the path difference and the angle between the terminal device and the intelligent reflecting surface.

For example, the location of the terminal device is $\{x_u, y_u\}$, and the location of the intelligent reflecting surface is $\{x_r, y_r\}$. The angle between the network device and the intelligent reflecting surface may be represented as:

$$\theta_2 = \arg\tan\left(\frac{x_u - x_r}{y_u - y_r}\right) \tag{22}$$

The angle between the network device and the intelligent reflecting surface may be represented as:

$$\theta_2 = \arg\sin\left(\sin\theta_1 - \frac{k\Delta\lambda}{2\pi\mu}\right) \quad (23)$$

It should be understood that the first angle may be understood as an incident angle, and the second angle may be understood as a reflection angle. The incident angle is an included angle between a normal and the first signal transmitted by the network device to the intelligent reflecting surface. The reflection angle is an included angle between the normal and a signal that is obtained through reflection by the intelligent reflecting surface for the first signal transmitted by the network device.

It should be understood that the first angle is the incident angle and the second angle is the reflection angle for the first signal transmitted by the network device to the intelligent reflecting surface. When the terminal device sends the first signal to the intelligent reflecting surface, the first angle is the reflection angle, and the second angle is the incident angle. When the network device sends the first signal to the intelligent reflecting surface, the first angle is the incident angle, and the second angle is the reflection angle.

It should be understood that after determining the angle between the terminal device and the intelligent reflecting surface based on the path difference, the terminal device may send the angle to the network device. The network device may determine the location of the terminal device based on at least one of the angle, the location of the network device, the location of the intelligent reflecting surface, and the angle (which may be referred to as a third angle) between the network device and the terminal device. In this way, a positioning result with higher precision than that in an existing positioning technology can be obtained.

It should be understood that the angle between the network device and the terminal device is determined by the network device based on an existing angle estimation technology.

According to step S450, in embodiments of this application, the second angle between the terminal device and the intelligent reflecting surface or the first angle between the intelligent reflecting surface and the network device is determined based on the path difference. The first angle or the second angle can be used to further determine the location or the orientation of the terminal device, to improve positioning precision of the terminal device.

In another embodiment, step S460 after step S440: The terminal device determines a distance between the terminal device and the intelligent reflecting surface based on the location of the intelligent reflecting surface and the location of the terminal device. In this way, the terminal device may further determine, based on the distance, a quantity of antenna elements that are for data transmission and that are in the intelligent reflecting surface.

Specifically, when the terminal device knows the location of the intelligent reflecting surface, the terminal device may determine the distance between the terminal device and the intelligent reflecting surface based on the location of the terminal device and the location of the intelligent reflecting surface. For example, the location of the intelligent reflecting surface is $\{x_r, y_r\}$, and the location of the terminal device is $\{x_u, y_u\}$. The distance between the terminal device and the intelligent reflecting surface may be represented as:

$$d = \sqrt{(x_u - x_r)^2 + (x_u - x_r)^2} \quad (24)$$

Further, the terminal device may send the distance between the terminal device and the intelligent reflecting surface to the network device. The network device determines, based on the distance and a Rayleigh distance (in other words, based on a relationship between the distance and the Rayleigh distance or a relationship between the distance and a Fraunhofer distance), the quantity of antenna elements that are for data transmission and that are in the intelligent reflecting surface.

The Rayleigh distance or the Fraunhofer distance is a distance indicating a boundary between far-field radiation and near-field radiation of an antenna. If a distance between a sending device and a receiving device is greater than or equal to the Rayleigh distance, a channel between the sending device and the receiving device conforms to a far-field radiation model; or if a distance between a sending device and a receiving device is less than the Rayleigh distance, a channel between the sending device and the receiving device conforms to a near-field radiation model.

According to step S460, in embodiments of this application, the quantity of antenna elements that are for data transmission and that are in the intelligent reflecting surface is further determined based on the distance between the terminal device and the intelligent reflecting surface. In this way, it can be ensured that a channel between the terminal device and the intelligent reflecting surface satisfies the far-field radiation model. The model can ensure accuracy and convenience of modeling, measurement, and data processing on the channel between the terminal device and the intelligent reflecting surface.

It should be understood that step S450 and step S460 may form a new technical solution for each other. A sequence of step S450 and step S460 is not limited in embodiments of this application.

In still another embodiment, step S470 after step S460: The terminal device determines, based on the distance and a Rayleigh distance between the terminal device and the intelligent reflecting surface, the quantity of antenna elements that are for data transmission and that are in the intelligent reflecting surface.

It should be understood that the quantity of antenna elements that are for data transmission and that are in the intelligent reflecting surface is related to an antenna aperture that is for data transmission and that is in the intelligent reflecting surface. The antenna aperture indicates an effective area of an antenna receive power. For a rectangular antenna panel with an area of a*b, the antenna aperture may be represented as $Z^2 = (a*b)$. When the antenna elements included in the intelligent reflecting surface are at an equal spacing, and the spacing is $\mu$, a quantity N of antenna elements that are for data transmission and that are in the intelligent reflecting surface is equal to $$\left(\frac{a}{\mu}\right) * \left(\frac{b}{\mu}\right).$$

For ease of description, in embodiments of this application, the quantity of antenna elements for data transmission is for description, but a manner of representing an aperture of the intelligent reflecting surface for data transmission is not excluded.

It should be understood that, to ensure that the channel between the intelligent reflecting surface and the terminal device satisfies a far-field radiation condition, the distance between the terminal device and the intelligent reflecting surface needs to be greater than the Rayleigh distance. It is assumed that a maximum antenna aperture of the antenna element that is for data transmission and that is in the intelligent reflecting surface is $Z^2$. For the rectangular antenna panel with the area of a*b, the maximum antenna aperture is $Z^2 = \max(a, b)^2$. When the antenna elements included in the intelligent reflecting surface are at an equal spacing, the spacing is μ, and the quantity N of antenna elements that are for data transmission and that are in the intelligent reflecting surface is equal to $\{\max(a, b)/\mu\}^2$, the distance between the terminal device and the intelligent reflecting surface needs to satisfy the following relational expression:

$$d > \frac{2Z^2}{\lambda} \quad (25)$$

$$\frac{2Z^2}{\lambda}$$

is the Rayleigh distance between the intelligent reflecting surface and the terminal device. It is assumed that an area of the antenna element that is for data transmission and that is in the intelligent reflecting surface is a*b, $Z^2 = \max(a, b)^2$, to be specific, Z may be represented as a maximum value between a and b, and a unit may be meter, millimeter, micrometer, or another unit indicating a length.

It can be learned from the foregoing formula that Z should satisfy:

$$Z < \sqrt{\frac{d\lambda}{2}}.$$

When a type of the intelligent reflecting surface is a planar array, and a codebook based on discrete Fourier transform (DFT) is usually used in the intelligent reflecting surface, in other words, a quantity N of antenna elements that are for data transmission and that are in the intelligent reflecting surface needs to be an even power of 2. Therefore, the quantity N of antenna elements that are for data transmission and that are in the intelligent reflecting surface is calculated as follows:

$$N = \frac{Z^2}{\mu^2} < 2^{2\left\lfloor \log_2\left(\frac{\sqrt{\frac{d\lambda}{2}}}{\mu}\right)\right\rfloor} \quad (26\text{-}1)$$

$2^{2\lfloor \log_2(\cdot) \rfloor}$ operation is to ensure that N is an even power of 2. When a carrier frequency, a bandwidth, and a predefined or preconfigured limitation on the quantity of antenna elements are considered, the quantity N of antenna elements that are for data transmission and that are in the intelligent reflecting surface may be further determined according to the following formula:

$$N = \frac{Z^2}{\mu^2} < 2^{2\left\lfloor \log_2 \min\left(\frac{\sqrt{\frac{d\lambda}{2}}}{\mu}, \xi, \frac{4fc}{B}\right)\right\rfloor} \quad (26\text{-}2)$$

N is the quantity of antenna elements that are for data transmission and that are in the intelligent reflecting surface, $f_c$ is the carrier frequency, B is the bandwidth, ξ is a predefined or preconfigured value, d is the distance between the intelligent reflecting surface and the terminal device, and λ is a wavelength. The codebook may be understood as a phase and/or an amplitude of an antenna element. It should be understood that N indicates a quantity.

In other words, the quantity of antenna elements that are for data transmission and that are in the intelligent reflecting surface is associated with the distance between the intelligent reflecting surface and the terminal device.

Further, the quantity of antenna elements that are for data transmission and that are in the intelligent reflecting surface is associated with the distance between the intelligent reflecting surface and the terminal device, the bandwidth, and the carrier frequency.

According to step S470, in embodiments of this application, the quantity of antenna elements that are for data transmission and that are in the intelligent reflecting surface is determined based on a relationship between the distance between the intelligent reflecting surface and the terminal device and the Rayleigh distance between the intelligent reflecting surface and the terminal device. In this way, it can be ensured that the channel between the terminal device and the intelligent reflecting surface satisfies the far-field radiation model. The model can ensure accuracy and convenience of modeling, measurement, and data processing on the channel between the terminal device and the intelligent reflecting surface.

It should be understood that steps S450 to S470 may alternatively be performed by the network device. Steps performed by the network device are consistent with steps performed by the terminal device. For specific content, refer to the foregoing descriptions. Details are not described herein again.

It should be understood that step S450, step S460, and step S470 may form a new technical solution. A sequence of step S450, step S460, and step S470 is not limited in embodiments of this application.

Figure 5:
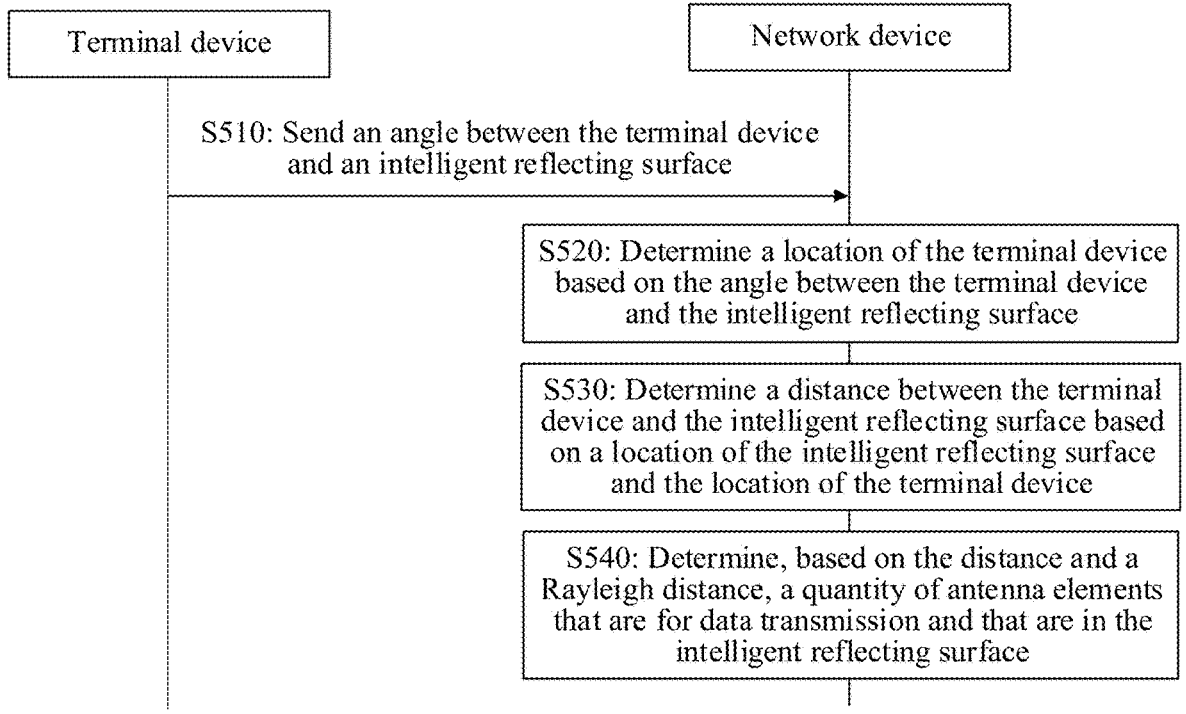
FIG. 5 is a schematic flowchart of another communication method according to an embodiment of this application.

FIG. 5 is a schematic flowchart of another communication method according to an embodiment of this application. The method includes the following steps.

S510: A terminal device sends an angle between the terminal device and an intelligent reflecting surface to a network device.

Correspondingly, the network device receives the angle that is between the terminal device and the intelligent reflecting surface and that is sent by the terminal device.

It should be understood that the angle that is between the terminal device and the intelligent reflecting surface and that is sent by the terminal device is determined by the terminal device according to step S450. For specific content, refer to the foregoing descriptions, and details are not described herein again.

S520: The network device determines a location of the terminal device based on the angle between the terminal device and the intelligent reflecting surface.

Specifically, the network device knows a location of the network device and a location of the intelligent reflecting surface, and the network device may determine the location of the terminal device based on the location of the network device, the location of the intelligent reflecting surface, the angle between the intelligent reflecting surface and the terminal device, and an angle between the terminal device and the network device.

For example, coordinates of the network device are $\{x_b, y_b\}$, coordinates of the intelligent reflecting surface are $\{x_r, y_r\}$, and coordinates of the terminal device are $\{x_u, y_u\}$. The angle $\theta_3$ between the network device and the terminal device may be represented as:

$$\tan\theta_3 = \frac{x_u - x_b}{y_u - y_b} \tag{27}$$

The angle between the terminal device and the intelligent reflecting surface be represented as:

$$\tan\theta_2 = \frac{x_u - x_r}{y_u - y_r} \tag{28}$$

Subtraction is performed on (15) and (16), and the coordinates $\{x_u, y_u\}$ of the terminal device may be respectively represented as:

$$x_u = \frac{\tan\theta_3 \tan\theta_2 (y_r - y_b) + \tan\theta_2 x_b - \tan\theta_3 x_r}{\tan\theta_2 - \tan\theta_3} \tag{29}$$

$$y_u = \frac{(x_r - x_b) + y_b \tan\theta_3 - y_r \tan\theta_2}{\tan\theta_3 - \tan\theta_2} \tag{30}$$

It should be understood that the network device may determine the angle between the terminal device and the network device based on the foregoing angle estimation technology, and determine the location of the terminal device based on the angle between the terminal device and the intelligent reflecting surface, the location of the network device, and the location of the intelligent reflecting surface.

In embodiments of this application, the angle between the terminal device and the intelligent reflecting surface is determined based on a path difference, and the location of the terminal device is determined based on the foregoing angle, the angle between the terminal device and the network device, the location of the network device, and the location of the intelligent reflecting surface, so that high-precision positioning of the terminal device by the network device can be ensured, interaction between network devices can be reduced, and implementation complexity can be reduced.

Specifically, in embodiments of this application, the network device and the intelligent reflecting surface jointly position the terminal device, in other words, adjust a phase of the intelligent reflecting surface in a plurality of times of measurement, and perform joint processing on a plurality of measurement results, to obtain the angle between the terminal device and the intelligent reflecting surface, and then further obtain the specific location of the terminal device based on the angle.

S530: The network device determines a distance between the terminal device and the intelligent reflecting surface based on the location of the intelligent reflecting surface and the location of the terminal device.

For specific content, refer to the descriptions of step S460.

In this way, the network device determines, based on a relationship between the distance and a Rayleigh distance between the terminal device and the intelligent reflecting surface, a quantity of antenna elements that are for data transmission and that are in the intelligent reflecting surface.

In this way, it can be ensured that a channel between the terminal device and the intelligent reflecting surface satisfies a far-field radiation model. The model can ensure accuracy and convenience of modeling, measurement, and data processing on the channel between the terminal device and the intelligent reflecting surface.

S540: The network device determines, based on the distance and the Rayleigh distance, the quantity of antenna elements that are for data transmission and that are in the intelligent reflecting surface.

For specific content, refer to the descriptions of step S470.

It should be understood that the distance that is between the terminal device and the intelligent reflecting surface and that is determined by the network device may be obtained by the network device through calculation, or may be sent by the terminal device to the network device (herein, refer to the foregoing descriptions of step S460).

According to the technical solution, in embodiments of this application, it can be ensured that the channel between the terminal device and the intelligent reflecting surface satisfies the far-field radiation model. The model can ensure the accuracy and the convenience of the modeling, the measurement, and the data processing on channel between the terminal device and the intelligent reflecting surface.

Figure 6:
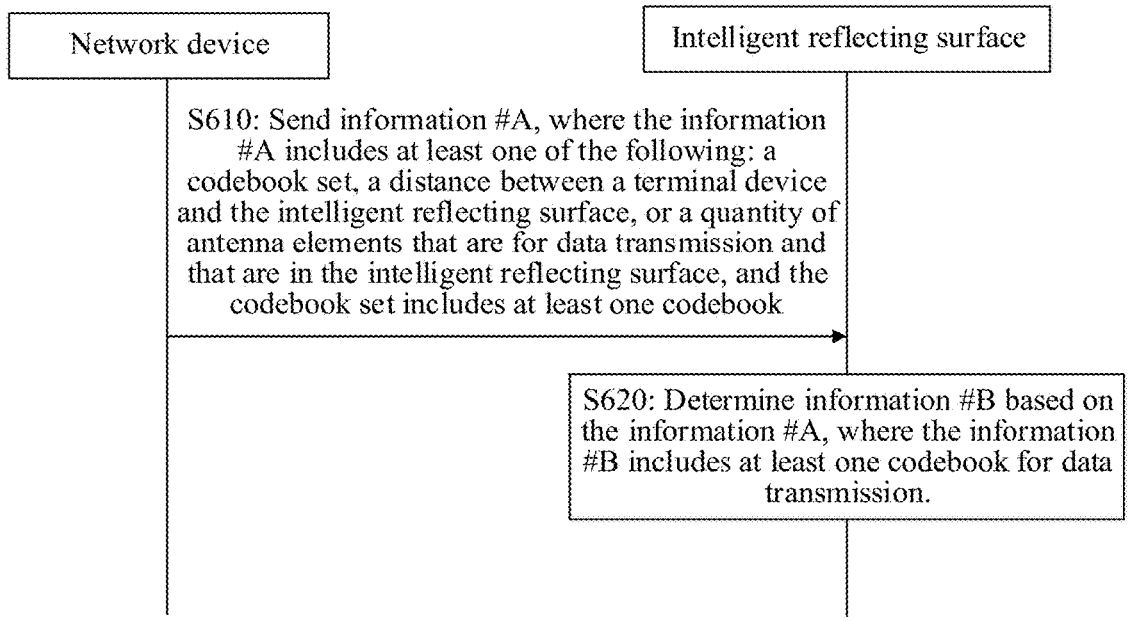
FIG. 6 is a schematic flowchart of still another communication method according to an embodiment of this application.

FIG. 6 is a diagram of still another communication method according to an embodiment of this application. The method includes the following steps.

S610: A network device sends information #A to an intelligent reflecting surface, where the information #A includes at least one of the following: a codebook set, a distance between a terminal device and the intelligent reflecting surface, or a quantity of antenna elements that are for data transmission and that are in the intelligent reflecting surface.

Correspondingly, the intelligent reflecting surface receives the information #A sent by the network device.

Specifically, the codebook set includes at least one codebook, and one codebook includes at least one of the following: a phase or an amplitude of one antenna element of the intelligent reflecting surface.

The network device determines one codebook set. A quantity of codebooks in the codebook set may be greater than the quantity of antenna elements that are for data transmission and that are in the intelligent reflecting surface, or may be less than the quantity of antenna elements that are for data transmission and that are in the intelligent reflecting surface, or may be equal to the quantity of antenna elements that are for data transmission and that are in the intelligent reflecting surface. One codebook corresponds to one antenna element.

The network device may send, to the intelligent reflecting surface, information #A including two parameters: the codebook set and the distance between the terminal device and the intelligent reflecting surface, may send information #A including two parameters: the codebook set and the quantity of antenna elements that are for data transmission and that are in the intelligent reflecting surface, may send information #A including the codebook set, may send information #A including the distance between the terminal device and the intelligent reflecting surface, or may send information #A including the quantity of antenna elements that are for data transmission and that are in the intelligent reflecting surface.

It should be understood that when the network device sends, to the intelligent reflecting surface, information #A including one of the foregoing three parameters, remaining two parameters may be configured in the intelligent reflecting surface in a preconfiguration manner. For example, the information #A includes the codebook set, and the quantity of antenna elements that are for data transmission and that are in the intelligent reflecting surface is preconfigured on the intelligent reflecting surface; or the distance between the terminal device and the intelligent reflecting surface is preconfigured on the intelligent reflecting surface. Therefore, the intelligent reflecting surface may determine information #B based on the information #A sent by the network device.

It should be understood that the codebook set sent by the network device to the intelligent reflecting surface is not a final codebook for data transmission, and the intelligent reflecting surface may determine, based on the codebook set sent by the network device, the final codebook for data transmission.

It should be understood that, in the foregoing technical solution related to channel measurement, the intelligent reflecting surface determines a path difference between the antenna elements by controlling and adjusting the phase rather than the amplitude of the antenna element. When data transmission is involved, the intelligent reflecting surface may adjust a channel condition for data transmission by adjusting the phase and the amplitude of the antenna element. The network device may determine a codebook set. A codebook in the codebook set may include a phase, or may be an amplitude, or may be a phase and an amplitude. Then, the network device sends the codebook set to the intelligent reflecting surface, and the intelligent reflecting surface determines, based on the codebook set, the codebook set for data transmission.

S620: The intelligent reflecting surface determines the information #B based on the information #A, where the information #B includes at least one codebook for data transmission.

Specifically, the intelligent reflecting surface determines the information #B based on the information #A. In other words, the intelligent reflecting surface determines, based on the information #A, the codebook set for data transmission, where the codebook set for data transmission includes at least one codebook.

It should be understood that, when the network device directly sends the quantity of antenna elements for data transmission to the intelligent reflecting surface, the intelligent reflecting surface may directly determine the quantity of antenna elements for data transmission. When the network device sends the distance between the intelligent reflecting surface and the terminal device to the intelligent reflecting surface, the intelligent reflecting surface may determine the quantity of antenna elements for data transmission based on formula (26-1) and/or formula (26-2).

For example, a quantity S of codebooks included in the codebook set provided by the network device is less than the quantity N of antenna elements that are for data transmission and that are in the intelligent reflecting surface. For example, S=10, and N=20. The intelligent reflecting surface may extend each codebook in the codebook set to two codebooks, to obtain 20 codebooks for data transmission. Specifically, extension may be implemented by adding a small-range phase shift to the codebook. A quantity of codebooks by which extension is performed for each codebook may be determined based on a ratio of N to S. Therefore, the quantity of codebooks in the codebook set for data transmission is the same as the quantity of antenna elements for data transmission.

For another example, a quantity S of codebooks included in the codebook set provided by the network device is greater than the quantity N of antenna elements that are for data transmission and that are in the intelligent reflecting surface. For example, S=20, and N=10. The intelligent reflecting surface may sample one codebook from two codebooks, to obtain 10 codebooks for data transmission. A specific sampling interval may be determined based on a ratio of S to N.

In an example, when the codebook set includes a far-field codebook and a near-field codebook, the network device sends indication information to the intelligent reflecting surface, where the indication information indicates the intelligent reflecting surface to select the near-field codebook or the far-field codebook. The near-field codebook represents a codebook that satisfies a near-field radiation model, and the far-field codebook represents a codebook that satisfies a far-field radiation model.

Specifically, when the network device sends the codebook set to the intelligent reflecting surface, a same far-field codebook and a same near-field codebook that include an amplitude and/or a phase may be preconfigured on the network device and the intelligent reflecting surface. The network device may dynamically indicate that the intelligent reflecting surface currently needs to use the near-field codebook or the far-field codebook. In this way, a codebook of the intelligent reflecting surface can match the actual far-field model or near-field model, to reduce a bit error rate of a system, and improve system spectral efficiency.

It should be understood that the indication information sent by the network device to the intelligent reflecting surface may be sent after the codebook set and the parameters are sent, or the indication information, the codebook set, and the parameters may be sent at the same time. This is not limited in embodiments of this application.

In an example, after the intelligent reflecting surface determines the quantity of antenna elements for data transmission and an angle between the intelligent reflecting surface and the terminal device, the intelligent reflecting surface directly generates, based on the angle, a codebook (the codebook is a phase, and does not include an amplitude) for data transmission. A phase of the $n^{th}$ antenna in the antenna element is $e^{-j(\theta_2 \pm n^* \varepsilon)}$. n is an index of an antenna in the antenna element, $\varepsilon$ is a preset deviation value, and the amplitude may be a constant amplitude.

According to the foregoing technical solutions, in embodiments of this application, the intelligent reflecting surface can have autonomy in selecting a codebook, to reduce complexity of implementing a controller of the intelligent reflecting surface by the network device, and improve flexibility of a system design.

In a possible implementation, a plurality of codebooks in the codebook set that is for data transmission and that is of the intelligent reflecting surface are determined by the network device, and the network device sends, to the intelligent reflecting surface, the plurality of codebooks that are determined by the network device and that are in the codebook set for data transmission. The quantity of codebooks in the codebook set is consistent with the quantity of antenna elements that are for data transmission and that are in the intelligent reflecting surface.

In an embodiment, the information #A may be sent by the network device to the intelligent reflecting surface, or the information #A may be preconfigured on the intelligent reflecting surface, in other words, the intelligent reflecting surface determines, by obtaining the preconfigured information #A, the information #B that includes the at least one codebook for data transmission.

In another embodiment, the information #A sent by the network device to the intelligent reflecting surface includes the codebook set, and the quantity of antenna elements that are for data transmission and that are in the intelligent reflecting surface is preconfigured on the intelligent reflecting surface. In this case, the intelligent reflecting surface may determine the information #B based on the information #A and the preconfigured quantity of antenna elements for data transmission.

In still another embodiment, the information #A sent by the network device to the intelligent reflecting surface includes the quantity of antenna elements that are for data transmission and that are in the intelligent reflecting surface, and the foregoing codebook set is preconfigured on the intelligent reflecting surface. In this case, the intelligent reflecting surface may determine the information #B based on the information #A and the preconfigured codebook set. In yet another embodiment, when the information #A sent by the network device to the intelligent reflecting surface includes the distance between the terminal device and the intelligent reflecting surface, the foregoing codebook set is preconfigured on the intelligent reflecting surface. In this case, the intelligent reflecting surface may also determine the information #B based on the information #A and the preconfigured codebook set.

It should be further understood that, when some antenna elements of the intelligent reflecting surface are damaged, or a same intelligent reflecting surface needs to assist a plurality of network devices, the intelligent reflecting surface may send, to the network device, request information used to request to select an antenna element, and the network device may send, to the intelligent reflecting surface, indication information indicates the intelligent reflecting surface to autonomously select the antenna element for measurement and reflection.

The foregoing describes the method embodiments in embodiments of this application, and the following describes corresponding apparatus embodiments.

Figure 7:
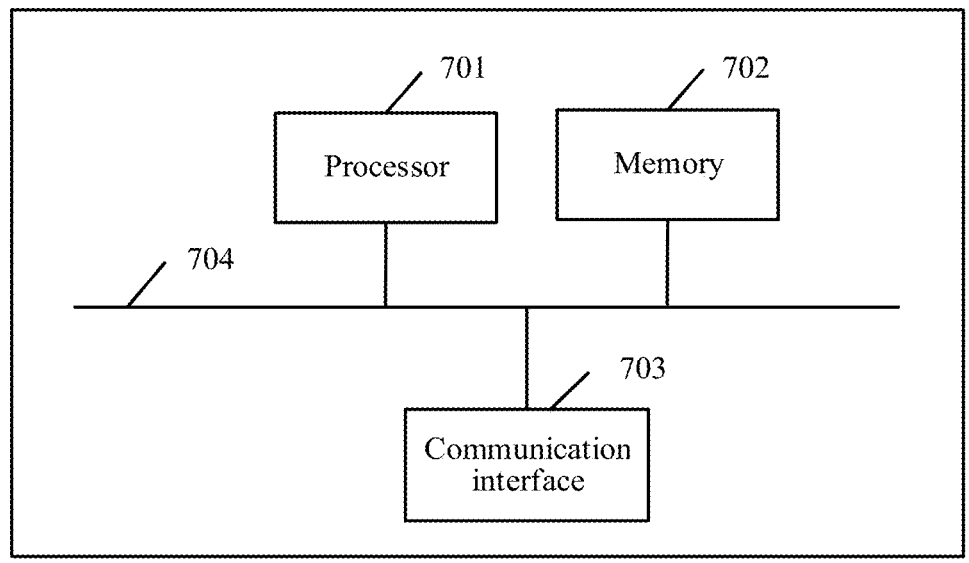
FIG. 7 is a schematic block diagram of a communication apparatus according to an embodiment of this application.

FIG. 7 is a diagram of a communication apparatus according to an embodiment of this application. The communication apparatus includes a processor 701, a memory 702, and a communication interface 703. The processor 701, the memory 702, and the communication interface 703 are connected to each other via a bus 704. It should be understood that the communication apparatus shown in FIG. 7 may be the foregoing network device, or may be a terminal device.

The memory 702 includes but is not limited to a random access memory (RAM), a read-only memory (ROM), an erasable programmable read-only memory (EPROM), or a compact disc read-only memory (CD-ROM). The memory 702 is configured to store related instructions and related data.

The processor 701 may be one or more central processing units (CPU). When the processor 701 is one CPU, the CPU may be a single-core CPU or a multi-core CPU.

When the communication apparatus is a network device, the processor 701 in the communication apparatus is configured to read program code stored in the memory 702, for example, perform the following operations:

obtaining a channel measurement result, where the channel measurement result is obtained by the network device based on at least two reflections by an antenna element set of an intelligent reflecting surface for a first signal sent by the terminal device; and determining a path difference between antenna elements of the intelligent reflecting surface based on the channel measurement result.

When the communication apparatus is a terminal device, the processor 701 in the communication apparatus is configured to read program code stored in the memory 702, for example, perform the following operations:

obtaining a channel measurement result, where the channel measurement result is obtained by the terminal device based on at least two reflections by an antenna element set of an intelligent reflecting surface for a first signal sent by the network device; and determining a path difference between antenna elements of the intelligent reflecting surface based on the channel measurement result.

It should be understood that the foregoing descriptions are merely an example. For specific content, reference may be made to the content shown in the foregoing method embodiment. In addition, for implementation of the operations in FIG. 7, refer to corresponding descriptions of the method embodiments shown in FIG. 2 to FIG. 6.

Figure 8:
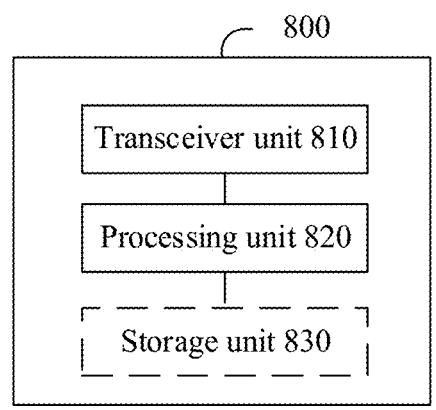
FIG. 8 is a schematic block diagram of another communication apparatus according to an embodiment of this application.

FIG. 8 is a diagram of another communication apparatus according to an embodiment of this application. The communication apparatus may be used in a network device, or may be used in a terminal device, and may be configured to implement the method in the foregoing embodiments. The communication apparatus includes a transceiver unit 810 and a processing unit 820. The following describes the transceiver unit 810 and the processing unit 820 by using examples.

When the communication apparatus is a network device, the transceiver unit 810 is configured to obtain a channel measurement result. The processing unit 820 is configured to determine a path difference between antenna elements of an intelligent reflecting surface based on the channel measurement result.

It should be understood that the transceiver unit 810 may be further configured to send a codebook set, a parameter, and indication information to the intelligent reflecting surface, or may be configured to receive parameters that are sent by the terminal device, for example, a distance and an angle between the terminal device and the intelligent reflecting surface, and a quantity of antenna elements that are for data transmission and that are in the intelligent reflecting surface. For specific content, reference may be made to the content described in the foregoing method embodiments.

When the communication apparatus is the terminal device, the transceiver unit 810 is configured to obtain the channel measurement result. The processing unit 820 is configured to determine the path difference between the antenna elements of the intelligent reflecting surface based on the channel measurement result.

It should be understood that the transceiver unit 810 may be further configured to send, to the network device, the angle between the terminal device and the intelligent reflecting surface, the distance between the terminal device and the intelligent reflecting surface, the quantity of antenna elements that are for data transmission and that are in the intelligent reflecting surface, and the like. For specific content, reference may be made to the content described in the foregoing method embodiments.

In a possible implementation, the communication apparatus further includes a storage unit 830, and the storage unit is configured to store a program or code used to perform the foregoing method.

In addition, for implementation of each operation in FIG. 8, refer to corresponding descriptions of the methods shown in the foregoing embodiments. Details are not described herein again.

Figure 9:
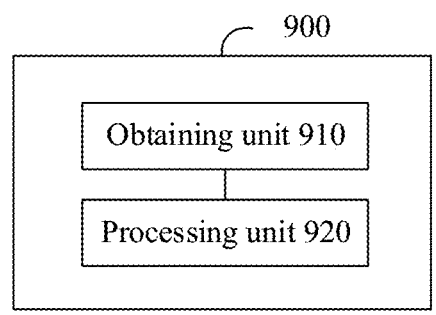
FIG. 9 is a schematic block diagram of still another communication apparatus according to an embodiment of this application.

FIG. 9 is a diagram of still another communication apparatus according to an embodiment of this application. The communication apparatus may be used in an intelligent reflecting surface, and may be configured to implement the method in the foregoing embodiment.

The communication apparatus includes an obtaining unit 910 and a processing unit 920. The following describes the obtaining unit 910 and the processing unit 920 by using examples.

The obtaining unit 910 may be configured to receive first information sent by a network device, and may be further configured to receive indication information sent by the network device, and the like. The processing unit 920 may be configured to determine second information and the like based on the first information sent by the network device. For specific content, reference may be made to the description of the foregoing method embodiment, and details are not described herein again.

Figure 10:
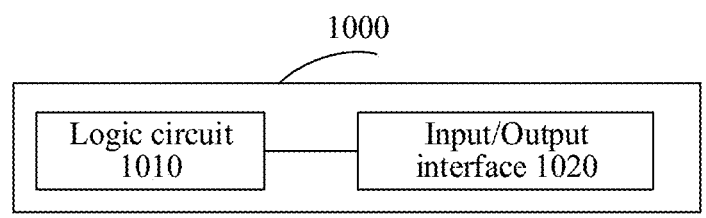
FIG. 10 is a schematic block diagram of yet another communication apparatus according to an embodiment of this application.

FIG. 10 is a diagram of yet another communication apparatus according to an embodiment of this application. The communication apparatus may be used in an intelligent reflecting surface, or may be used in a network device and a terminal device, and may be configured to implement the method in the foregoing embodiments. The communication apparatus includes a logic circuit 1010 and an input/output interface 1020. The logic circuit 1010 is configured to perform the methods or steps related to the network device, the terminal device, or the intelligent reflecting surface in the foregoing method embodiments. For specific content, refer to the foregoing descriptions, and details are not described herein again. The input/output interface 1020 is configured to connect a logic circuit to another module. It should be understood that the apparatus embodiments shown in FIG. 7 to FIG. 10 are used to implement the content described in FIG. 2 to FIG. 6 in the foregoing method embodiments. Therefore, for specific execution steps and methods of the apparatuses shown in FIG. 7 to FIG. 10, refer to the content described in the foregoing method embodiments.

An embodiment of this application further provides a chip, including a processor, configured to invoke, from a memory, instructions stored in the memory and run the instructions, to enable a communication device on which the chip is installed to perform the methods in the foregoing examples.

An embodiment of this application further provides another chip, including an input interface, an output interface, a processor, and a memory. The input interface, the output interface, the processor, and the memory are connected by using an internal connection path. The processor is configured to execute code in the memory. When the code is executed, the processor is configured to perform the methods in the foregoing examples.

An embodiment of this application further provides a processor, configured to be coupled to a memory, and configured to perform a method and a function that are related to a satellite or user equipment in any one of the foregoing embodiments.

In another embodiment of this application, a computer program product is provided. When the computer program product runs on a computer, the method in the foregoing embodiment is implemented.

In another embodiment of this application, a computer-readable storage medium is provided. The computer-readable storage medium stores a computer program. When the computer program is executed by a computer, the method in the foregoing embodiment is implemented.

In the descriptions of embodiments of this application, the term "a plurality of" means two or more than two unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, words such as "example" or "for example" are used to represent an example or a description.

Any embodiment or design scheme described as an "example" or "for example" in embodiments of this application should not be construed as being more preferred or more advantageous than another embodiment or design scheme. Exactly, use of the terms such as "example" or "for example" are intended to present a related concept in a specific manner for ease of understanding.

Unless otherwise specified, "/" in the descriptions of embodiments of this application represents an "or" relationship between associated objects. For example, A/B may represent A or B. In this application, "and/or" represents only an association relationship for describing associated objects and represents that three relationships may exist. For example, A and/or B may represent the following three cases: Only A exists, both A and B exist, and only B exists. A and B may be singular or plural.

It should be understood that "one embodiment" or "an embodiment" mentioned throughout this specification means that specific features, structures, or characteristics related to embodiments are included in at least one embodiment of the present invention.

Therefore, "in one embodiment" or "in an embodiment" appearing throughout the specification does not necessarily refer to a same embodiment. In addition, these particular features, structures, or characteristics may be combined in one or more embodiments by using any appropriate manner. Sequence numbers of the foregoing processes do not mean execution sequences in various embodiments of the present invention. The execution sequences of the processes should be determined based on functions and internal logic of the processes, and should not be construed as any limitation on the implementation processes of embodiments of the present invention.

It may be understood that an "embodiment" mentioned throughout this specification means that particular features, structures, or characteristics related to embodiments are included in at least one embodiment of this application.

Therefore, embodiments in the entire specification do not necessarily refer to a same embodiment. In addition, these particular features, structures, or characteristics may be combined in one or more embodiments by using any appropriate manner. It may be understood that sequence numbers of processes do not mean execution sequences in various embodiments of this application. The execution sequences of the processes should be determined based on functions and internal logic of the processes, and should not be construed as any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again. In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed.

In addition, displayed or discussed mutual couplings or direct couplings or communication connections may be implemented through some interfaces. Indirect couplings or communication connections between the apparatuses or the units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments. In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, comprising at least one processor, and one or more memories coupled to the at least one processor and storing programming instructions for execution by the at least one processor to perform operations comprising:
   obtaining a channel measurement result, based on at least two reflections by an antenna element set of an intelligent reflecting surface for a first signal sent by a network device, wherein the first signal is for channel measurement, and the antenna element set comprises at least two antenna elements; and
   determining a path difference between the at least two antenna elements of the intelligent reflecting surface based on the channel measurement result.

2. The apparatus according to claim 1, wherein the antenna element set comprises a first antenna element set and a second antenna element set, wherein
   the first antenna element set comprises at least one first antenna element, and the second antenna element set comprises at least one second antenna element, and
   the first antenna element set and the second antenna element set correspond to different phases in the at least two reflections.

3. The apparatus according to claim 2, wherein the different phases comprise any one of the following groups:
   the first antenna element set corresponds to a first phase, and the second antenna element set corresponds to the first phase;
   the first antenna element set corresponds to the first phase, and the second antenna element set corresponds to a second phase;
   the first antenna element set corresponds to the second phase, and the second antenna element set corresponds to the first phase; or
   the first antenna element set corresponds to the second phase, and the second antenna element set corresponds to the second phase, wherein
   the first phase is different from the second phase.

4. The apparatus according to claim 1, wherein the operations further comprise:
   determining a first angle between the network device and the intelligent reflecting surface based on the path difference.

5. The apparatus according to claim 4, wherein the operations further comprise: sending the second angle to the network device.

6. The apparatus according to claim 1, wherein the operations further comprise: determining a distance between the communication apparatus and the intelligent reflecting surface based on a location of the intelligent reflecting surface and a location of the communication apparatus.

7. The apparatus according to claim 6, wherein the operations further comprise: sending the distance between the communication apparatus and the intelligent reflecting surface to the network device.

8. The apparatus according to claim 6, wherein the operations further comprise: determining, based on the distance between the communication apparatus and the intelligent reflecting surface and a Rayleigh distance, a quantity of antenna elements that are for data transmission and that are in the intelligent reflecting surface.

9. The apparatus according to claim 8, wherein the operations further comprise: sending, to the network device, the quantity of antenna elements for data transmission.

10. A communication apparatus, comprising at least one processor, and one or more memories coupled to the at least one processor and storing programming instructions for execution by the at least one processor to perform operations comprising:
  obtaining a channel measurement result, based on at least two reflections by an antenna element set of an intelligent reflecting surface for a first signal sent by a terminal device, wherein the first signal is for channel measurement, and the antenna element set comprises at least two antenna elements; and
  determining a path difference between the at least two antenna elements of the intelligent reflecting surface based on the channel measurement result.

11. The apparatus according to claim 10, wherein the antenna element set comprises a first antenna element set and a second antenna element set, wherein
  the first antenna element set comprises at least one first antenna element, and the second antenna element set comprises at least one second antenna element, and
  the first antenna element set and the second antenna element set correspond to different phases in the at least two reflections.

12. The apparatus according to claim 11, wherein the different phases comprise any one of the following groups:
  the first antenna element set corresponds to a first phase, and the second antenna element set corresponds to the first phase;
  the first antenna element set corresponds to the first phase, and the second antenna element set corresponds to a second phase;
  the first antenna element set corresponds to the second phase, and the second antenna element set corresponds to the first phase; or
  the first antenna element set corresponds to the second phase, and the second antenna element set corresponds to the second phase, wherein
  the first phase is different from the second phase.

13. The apparatus according to claim 10, wherein
  the operations further comprise: determining a first angle between the communication apparatus and the intelligent reflecting surface based on the path difference; or
  the operations further comprise: determining a second angle between the intelligent reflecting surface and the terminal device based on the path difference.

14. The apparatus according to claim 13, wherein the operations further comprise: determining a location of the terminal device based on the second angle.

15. The apparatus according to claim 14, wherein the operations further comprise:
  determining a distance between the terminal device and the intelligent reflecting surface; and
  determining, based on the distance and a Rayleigh distance between the terminal device and the intelligent reflecting surface, a quantity of antenna elements that are for data transmission and that are in the intelligent reflecting surface.

16. The apparatus according to claim 10, wherein the operations further comprise: sending first information to the intelligent reflecting surface, wherein
  the first information comprises at least one of the following: a codebook set, the distance between the terminal device and the intelligent reflecting surface, or the quantity of antenna elements that are for data transmission and that are in the intelligent reflecting surface, wherein
  the codebook set comprises at least one codebook, and one codebook comprises at least one of the following: an amplitude or a phase of one antenna element of the intelligent reflecting surface.

17. The apparatus according to claim 16, wherein the codebook set comprises a near-field codebook and a far-field codebook, and
  the operations further comprise: sending indication information to the intelligent reflecting surface, wherein the indication information indicates the intelligent reflecting surface to select the near-field codebook or the far-field codebook.

18. A communication apparatus, comprising at least one processor, and one or more memories coupled to the at least one processor and storing programming instructions for execution by the at least one processor to perform operations comprising:
  obtaining first information, wherein the first information comprises at least one of the following: a codebook set, a distance between a terminal device and the communication apparatus, or a quantity of antenna elements that are for data transmission and that are in the communication apparatus; and
  determining second information based on the first information, wherein the second information comprises at least one codebook for data transmission, wherein
  the codebook set comprises at least one codebook, and one codebook comprises at least one of the following: an amplitude or a phase of one antenna element of the communication apparatus.

19. The apparatus according to claim 18, wherein the codebook set comprises a near-field codebook and a far-field codebook, and the operations further include:
  receiving indication information sent by a network device, wherein the indication information indicates the communication apparatus to select the near-field codebook or the far-field codebook.

20. The apparatus according to claim 1, wherein the operations further comprise:
  determining a second angle between the intelligent reflecting surface and the communication apparatus based on the path difference.

* * * * *